US011481186B2

(12) United States Patent
Pratt et al.

(10) Patent No.: US 11,481,186 B2
(45) Date of Patent: Oct. 25, 2022

(54) AUTOMATED ASSISTANT CONTEXT AND PROTOCOL

(71) Applicant: AT&T INTELLECTUAL PROPERTY I, L.P., Atlanta, GA (US)

(72) Inventors: James Pratt, Round Rock, TX (US);
Miranda Huet, Austin, TX (US);
William Knotts, Driftwood, TX (US);
Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/171,067

(22) Filed: Oct. 25, 2018

(65) Prior Publication Data
US 2020/0133629 A1  Apr. 30, 2020

(51) Int. Cl.
*G06F 3/16* (2006.01)
*G06F 9/451* (2018.01)
*H04L 67/01* (2022.01)

(52) U.S. Cl.
CPC .............. *G06F 3/167* (2013.01); *G06F 9/453* (2018.02); *H04L 67/01* (2022.05)

(58) Field of Classification Search
CPC ..... G10L 15/22; G10L 15/07; G10L 15/1815; G10L 15/26; G10L 13/00; G10L 13/04;
(Continued)

(56) References Cited

U.S. PATENT DOCUMENTS 6,334,103 B1  12/2001  Surace et al.
7,565,433 B1   7/2009  Lamport
(Continued)

FOREIGN PATENT DOCUMENTS

| EP | 1197898 A2 | 4/2002 |
| WO | 2010009869 A2 | 1/2010 |
| WO | 2020009591 A1 | 1/2020 |

OTHER PUBLICATIONS

Alam, et al. "Predicting personality traits using multimodal information", Proceedings of the 2014 ACM Multi Media on Workshop on Computational Personality Recognition. ACM, 2014, 4 pages.
(Continued)

*Primary Examiner* — Michael Roswell
(74) *Attorney, Agent, or Firm* — Amin, Turocy & Watson, LLP

(57) ABSTRACT

Virtual assistants (VAs) can be managed in interactions with communication devices (and associated users) or other VAs. A communication management component (CMC) can track an interaction between a VA and a communication device of a user or another VA with regard to an event. The CMC can analyze information relating to the interaction to determine a context of the interaction. The CMC can manage the VA, the involvement of the communication device in the interaction, or the other VA based on the context. When indicated by the context, the CMC can modify characteristics associated with the VA to enhance the interaction. When another communication device or another VA enter the interaction in progress, the CMC can determine interaction update information, based on the tracking of the interaction, and can communicate the interaction update information to the other communication device (and associated user) or other VA.

20 Claims, 11 Drawing Sheets

(58) Field of Classification Search
CPC ........... G10L 15/1822; G10L 2015/223; G10L 25/48; G06F 3/167; G06F 9/453; G06F 16/90332; G06F 16/951; G06F 17/2785; G06F 17/289; G06F 16/637; G06F 16/9535; G06F 17/28; G06F 3/01; G06F 3/048; G06F 3/04842; G06F 16/243; G06F 16/24522; G06F 16/24565; G06F 3/0488; G06F 3/162; G06F 3/165; G06F 16/27; G06F 40/117; G06F 40/131; G06F 40/30; H04M 2203/355; H04L 67/42; H04L 67/12; H04L 67/22

See application file for complete search history.

(56) References Cited

U.S. PATENT DOCUMENTS

| | | | |
|---|---|---|---|
| 7,711,825 | B2 | 5/2010 | Lamport |
| 7,797,261 | B2 | 9/2010 | Yang |
| 7,856,502 | B2 | 12/2010 | Lamport et al. |
| 7,944,448 | B2 | 5/2011 | Iwamura et al. |
| 8,909,693 | B2 | 12/2014 | Frissora et al. |
| 8,930,815 | B2 | 1/2015 | Moore |
| 8,966,568 | B2 | 2/2015 | Abendroth et al. |
| 9,172,747 | B2 | 10/2015 | Walters et al. |
| 9,276,802 | B2 | 3/2016 | Lynch et al. |
| 9,324,057 | B2 | 4/2016 | Krishnaswamy et al. |
| 9,386,152 | B2 * | 7/2016 | Riahi ................ H04M 3/4936 |
| 9,390,243 | B2 | 7/2016 | Dhillon et al. |
| 9,471,638 | B2 | 10/2016 | Roytman et al. |
| 9,479,931 | B2 | 10/2016 | Ortiz et al. |
| 9,501,743 | B2 | 11/2016 | Tur et al. |
| 9,531,695 | B2 | 12/2016 | Koppolu et al. |
| 9,536,065 | B2 | 1/2017 | Bouse et al. |
| 9,762,734 | B1 | 9/2017 | McCarthy-Howe et al. |
| 9,786,299 | B2 | 10/2017 | Un et al. |
| 9,787,841 | B2 | 10/2017 | Chishti et al. |
| 9,805,718 | B2 * | 10/2017 | Ayan ................ H04M 3/4936 |
| 9,812,151 | B1 | 11/2017 | Amini et al. |
| 9,817,872 | B2 | 11/2017 | Pamu et al. |
| 9,823,811 | B2 | 11/2017 | Brown et al. |
| 9,830,044 | B2 | 11/2017 | Brown et al. |
| 9,836,177 | B2 | 12/2017 | Brown et al. |
| 9,881,614 | B1 | 1/2018 | Thirukovalluru et al. |
| 9,928,106 | B2 | 3/2018 | Hosabettu et al. |
| 9,934,493 | B2 | 4/2018 | Castinado et al. |
| 9,973,457 | B2 | 5/2018 | Cauchois et al. |
| 10,009,666 | B1 * | 6/2018 | van Scheltinga ....... G10L 15/22 |
| 10,032,137 | B2 | 8/2018 | Skiba et al. |
| 10,043,516 | B2 * | 8/2018 | Saddler ................ G06F 3/165 |
| 10,069,915 | B2 | 9/2018 | Dhuse et al. |
| 10,204,627 | B2 * | 2/2019 | Nitz ........................ G10L 15/30 |
| 10,276,185 | B1 | 4/2019 | Ma ......................... G10L 21/04 |
| 10,388,272 | B1 * | 8/2019 | Thomson ............. G10L 15/063 |
| 10,395,659 | B2 * | 8/2019 | Piercy ..................... G10L 15/22 |
| 2005/0064374 | A1 | 3/2005 | Spector |
| 2005/0125793 | A1 | 6/2005 | Aguilar, Jr. et al. |
| 2007/0035764 | A1 * | 2/2007 | Aldrich ................ H04L 51/066 |
| | | | 358/1.15 |
| 2008/0096533 | A1 | 4/2008 | Manfredi et al. |
| 2008/0159547 | A1 | 7/2008 | Schuler et al. |
| 2008/0269958 | A1 | 10/2008 | Filev et al. |
| 2009/0132371 | A1 | 5/2009 | Strietzel et al. |
| 2009/0209341 | A1 | 8/2009 | Okada |
| 2010/0082515 | A1 | 4/2010 | Relyea et al. |
| 2010/0100907 | A1 | 4/2010 | Chang et al. |
| 2010/0223297 | A1 | 9/2010 | Li et al. |
| 2011/0064388 | A1 | 3/2011 | Brown et al. |
| 2011/0106674 | A1 | 5/2011 | Perlman |
| 2011/0138299 | A1 * | 6/2011 | Pugsley ............. G06F 16/9535 |
| | | | 715/748 |
| 2011/0172873 | A1 | 7/2011 | Szwabowski et al. |
| 2011/0193726 | A1 | 8/2011 | Szwabowski et al. |
| 2012/0084781 | A1 | 4/2012 | Isaka |
| 2012/0137367 | A1 | 5/2012 | Dupont et al. |
| 2012/0221504 | A1 | 8/2012 | Rosini et al. |
| 2012/0254280 | A1 | 10/2012 | Parker, II |
| 2013/0006874 | A1 | 1/2013 | Klemm |
| 2013/0081032 | A1 | 3/2013 | Levien et al. |
| 2013/0152092 | A1 * | 6/2013 | Yadgar ..................... G10L 15/19 |
| | | | 718/102 |
| 2013/0219406 | A1 | 8/2013 | Hatabe et al. |
| 2013/0305169 | A1 | 11/2013 | Gold |
| 2013/0332985 | A1 | 12/2013 | Sastry et al. |
| 2014/0053223 | A1 | 2/2014 | Vorobyov et al. |
| 2014/0125678 | A1 | 5/2014 | Wang et al. |
| 2014/0160149 | A1 | 6/2014 | Blackstock et al. |
| 2014/0244712 | A1 * | 8/2014 | Walters ................... H04L 67/10 |
| | | | 709/202 |
| 2014/0245140 | A1 | 8/2014 | Brown et al. |
| 2014/0310001 | A1 * | 10/2014 | Kains .................. G10L 15/1822 |
| | | | 704/270.1 |
| 2014/0365407 | A1 | 12/2014 | Brown et al. |
| 2015/0071450 | A1 | 3/2015 | Boyden et al. |
| 2015/0081361 | A1 | 3/2015 | Lee et al. |
| 2015/0084838 | A1 * | 3/2015 | Chang .................... G06F 3/1454 |
| | | | 345/2.1 |
| 2015/0088514 | A1 * | 3/2015 | Typrin ..................... G06F 3/167 |
| | | | 704/249 |
| 2015/0169336 | A1 * | 6/2015 | Harper ..................... G10L 15/22 |
| | | | 715/706 |
| 2015/0169383 | A1 | 6/2015 | van den Berghe |
| 2015/0185996 | A1 | 7/2015 | Brown et al. |
| 2015/0186155 | A1 | 7/2015 | Brown et al. |
| 2015/0213800 | A1 * | 7/2015 | Krishnan ................ G10L 25/63 |
| | | | 704/246 |
| 2015/0234377 | A1 | 8/2015 | Mizikovsky |
| 2016/0004564 | A1 | 1/2016 | Park et al. |
| 2016/0086500 | A1 | 3/2016 | Kaleal, III |
| 2016/0099892 | A1 * | 4/2016 | Palakovich ............ H04L 51/02 |
| | | | 709/206 |
| 2016/0119478 | A1 | 4/2016 | Sharpe et al. |
| 2016/0225187 | A1 * | 8/2016 | Knipp .................... G06T 19/006 |
| 2016/0294952 | A1 | 10/2016 | Bodell et al. |
| 2017/0017522 | A1 | 1/2017 | Daga et al. |
| 2017/0031735 | A1 | 2/2017 | Levien et al. |
| 2017/0068423 | A1 | 3/2017 | Napolitano et al. |
| 2017/0078403 | A1 | 3/2017 | Obata et al. |
| 2017/0124645 | A1 | 5/2017 | Kortina et al. |
| 2017/0154637 | A1 | 6/2017 | Chu et al. |
| 2017/0160813 | A1 * | 6/2017 | Divakaran ............. G06F 3/017 |
| 2017/0163750 | A1 * | 6/2017 | Sullivan ................ H04L 67/22 |
| 2017/0206095 | A1 | 7/2017 | Gibbs et al. |
| 2017/0249104 | A1 | 8/2017 | Moon et al. |
| 2017/0255496 | A1 | 9/2017 | Deng et al. |
| 2017/0269972 | A1 | 9/2017 | Hosabettu et al. |
| 2017/0269975 | A1 * | 9/2017 | Wood ....................... G06F 3/167 |
| 2017/0270431 | A1 | 9/2017 | Hosabettu et al. |
| 2017/0289069 | A1 | 10/2017 | Plumb et al. |
| 2017/0300648 | A1 * | 10/2017 | Charlap ................ G16H 50/30 |
| 2017/0344889 | A1 | 11/2017 | Sengupta et al. |
| 2017/0357478 | A1 * | 12/2017 | Piersol ..................... G06F 3/167 |
| 2018/0018373 | A1 | 1/2018 | Yazdian et al. |
| 2018/0047029 | A1 | 2/2018 | Saso et al. |
| 2018/0053119 | A1 | 2/2018 | Zeng et al. |
| 2018/0054523 | A1 | 2/2018 | Zhang et al. |
| 2018/0082683 | A1 * | 3/2018 | Chen .................... G06F 21/6263 |
| 2018/0095512 | A1 | 4/2018 | Artstain et al. |
| 2018/0095624 | A1 | 4/2018 | Osman et al. |
| 2018/0107930 | A1 * | 4/2018 | Aggarwal .............. G06N 5/02 |
| 2018/0191862 | A1 | 7/2018 | Encarnacion et al. |
| 2018/0197542 | A1 | 7/2018 | Horling et al. |
| 2018/0203847 | A1 | 7/2018 | Akkiraju et al. |
| 2018/0211058 | A1 | 7/2018 | Aunger et al. |
| 2018/0232571 | A1 * | 8/2018 | Bathiche ............. G06K 9/00369 |
| 2018/0286395 | A1 | 10/2018 | Li et al. |
| 2018/0307542 | A1 | 10/2018 | Kawakami et al. |
| 2018/0314689 | A1 | 11/2018 | Wang et al. |
| 2018/0335903 | A1 * | 11/2018 | Coffman ................ G06F 3/0414 |
| 2018/0338038 | A1 * | 11/2018 | Ly ............................ H04M 3/42008 |
| 2018/0373547 | A1 | 12/2018 | Dawes |
| 2018/0375807 | A1 * | 12/2018 | Krans .................... H04L 51/18 |
| 2019/0073660 | A1 * | 3/2019 | Aung ..................... G06Q 20/24 |

(56) References Cited

U.S. PATENT DOCUMENTS

| | | | |
|---|---|---|---|
| 2019/0074987 A1* | 3/2019 | Wiener | H04L 12/1822 |
| 2019/0187787 A1* | 6/2019 | White | G06N 20/00 |
| 2019/0188756 A1* | 6/2019 | Bradley | G06Q 30/0269 |
| 2019/0304213 A1* | 10/2019 | Chen | G07C 5/0833 |
| 2019/0371315 A1 | 12/2019 | Newendorp et al. | |
| 2019/0391716 A1 | 12/2019 | Badr et al. | |
| 2020/0013423 A1 | 1/2020 | Benway et al. | |
| 2020/0098358 A1 | 3/2020 | Rakshit et al. | |

OTHER PUBLICATIONS

Siddique, et al. "Zara returns: Improved personality induction and adaptation by an empathetic virtual agent", Proceedings of ACL 2017, System Demonstrations (2017): pp. 121-126.

Silva-Coira, et al. "Intelligent Virtual Assistant for Gamified Environments", PACIS. 2016. 9 pages.

Ivanovic, et al. "Emotional agents-state of the art and applications", Computer Science and Information Systems 12.4 (2015): pp. 1121-1148.

Feidakis, et al. "A Dual-Modal System that Evaluates User's Emotions in Virtual Learning Environments and Responds Affectively", J. UCS 19.11 (2013): pp. 1638-1660.

Gold, Hannah. "Sophia the Robot Would Like to Have a Child Named 'Sophia'" [https://jezebel.com/sophia-the-robot-would-like-to-have-a-child-named- sophi-1820821870] Jezebel, Nov. 28, 2017, 3 pages.

Stone, Zara. "Everything You Need To Know About Sophia, The World's First Robot Citizen" [https://www.forbes.com/sites/zarastone/2017/11/07/everything-you-need-to-know-about-sophia-the-worlds-first-robot-citizen/#158f4eeb46fa], Forbes, Nov. 7, 2017, 8 pages.

Kemeny, Richard. "Anti-Swearing AI Takes the Edge Off Abuse on Reddit and Twitter" [https://www.newscientist.com/article/2170650-anti-swearing-ai-takes-the-edge-off-abuse-on-reddit-and-twitter/] New Scientist, Jun. 4, 2018, 3 pages.

Leviathan, et al. "Google Duplex: An AI System for Accomplishing Real-World Tasks Over the Phone" [https://ai.googleblog.com/2018/05/duplex-ai-system-for-natural-conversation.html], Google AI Blog, May 8, 2018, 7 pages.

Holley, Peter. "This app knows when you've been in an accident—and then it calls 911 for you". The Washington Post [https://www.washingtonpost.com/technology/2018/10/02/this-app-knows-when-youve-been-an-accident-then-it-calls-you/?noredirect=on]. Oct. 2, 2018. 3 pages.

Non-Final Office Action received for U.S. Appl. No. 16/129,267 dated Jan. 27, 2020, 28 pages.

Final Office Action received for U.S. Appl. No. 16/221,418 dated Mar. 8, 2021, 46 pages.

Final Office Action received for U.S. Appl. No. 16/029,523 dated Nov. 20, 2020, 32 pages.

Non Final Office Action received for U.S. Appl. No. 16/221,418 dated Nov. 10, 2020, 40 pages.

Final Office Action received for U.S. Appl. No. 16/221,418 dated Jul. 29, 2020, 38 pages.

Non-Final Office Action received for U.S. Appl. No. 16/029,523 dated Jun. 15, 2020, 73 pages.

Notice of Allowance received for U.S. Appl. No. 16/129,267 dated Jun. 10, 2020, 24 pages.

Non-Final Office Action received for U.S. Appl. No. 16/221,418 dated Apr. 16, 2020, 44 pages.

Non Final Office Action received for U.S. Appl. No. 17/017,210 dated Sep. 2, 2021, 51 pages.

Notice of Allowance received for U.S. Appl. No. 17/017,210 dated Jan. 3, 2022, 26 pages.

* cited by examiner

AUTOMATED ASSISTANT CONTEXT AND PROTOCOL

TECHNICAL FIELD

This disclosure relates generally to electronic communications, e.g., to an automated assistant context and protocol.

BACKGROUND

Communication devices (e.g., landline phones, mobile phones, electronic pads or tablets, computers, . . . ) can be utilized to engage in electronic communications (e.g., voice and/or data traffic) between entities associated with the communication devices. Various services can be provided to and utilized by entities using communication devices in a communication network.

The above-described description is merely intended to provide a contextual overview regarding electronic communications, and is not intended to be exhaustive.

DETAILED DESCRIPTION

Figure 1:
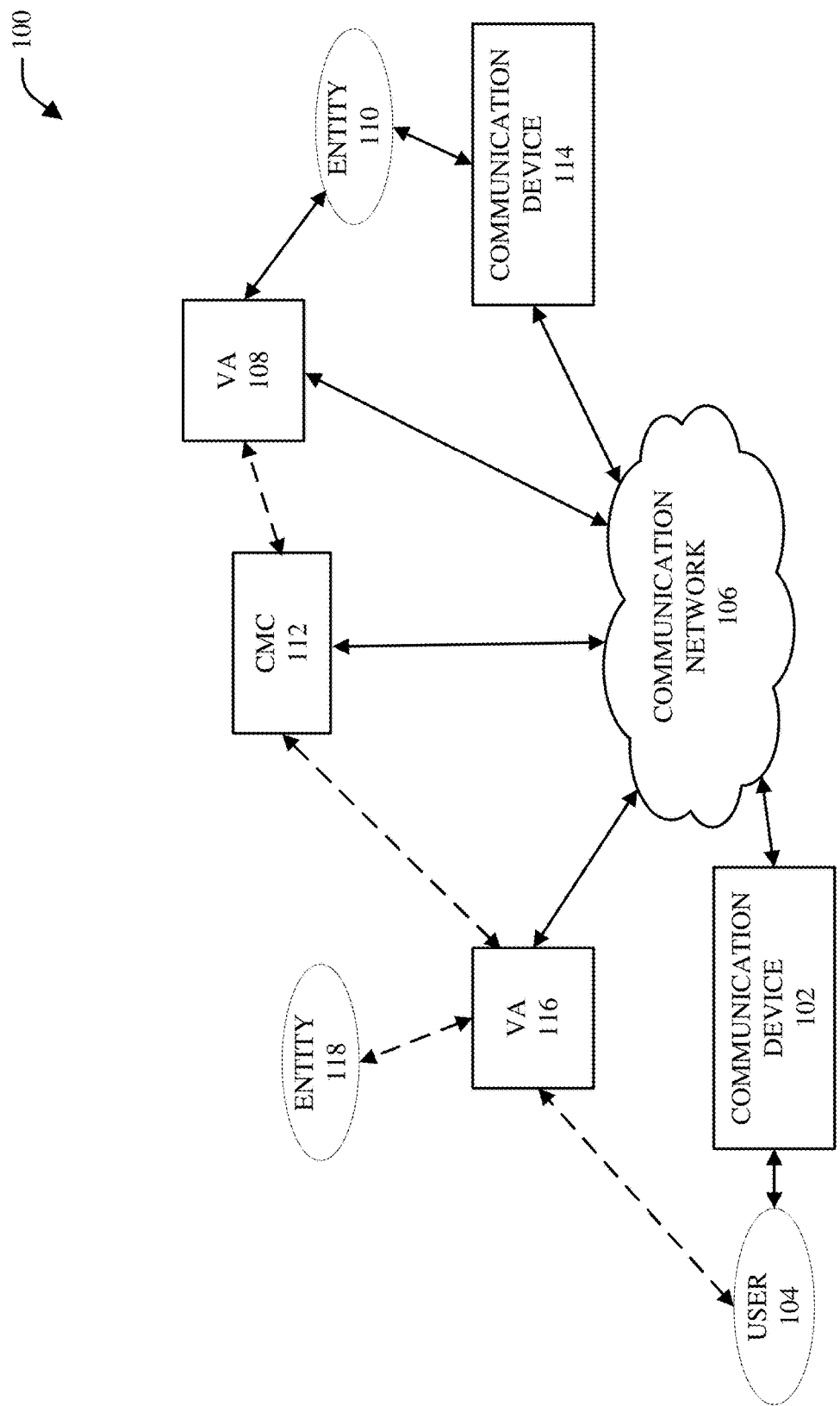
FIG. 1 illustrates a block diagram of an example system that can manage virtual assistants (VAs) in interactions with users, other VAs, or other entities, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Communication devices (e.g., landline phones, mobile phones, electronic pads or tablets, computers, devices in or integrated with vehicles, . . . ), can operate and communicate via wireline or wireless communication connections (e.g., communication links or channels) in a communication network to perform desired transfers of data (e.g., voice and/or data communications), utilize services, engage in transactions or other interactions, and/or perform other operations. For example, communication devices can be utilized to engage in online-related commerce and/or perform transactions between entities associated with the communication devices, wherein the entities can comprise human users or other users or entities, such as virtual assistants (VAs) and/or software entities or components. As another example, communication devices can be utilized to utilize or provide a service, wherein the communication session between the communication devices can involve one or more human users, one or more VAs, and/or one or more other entities (e.g., software entities or components).

VAs can engage in and/or complete conversations, on behalf of humans, with other humans. In such two-party conversation, it can be desirable for both parties to know and understand the nature of the interaction. For instance, it can be desirable for both parties to know whether a VA, a human, or some hybrid combination of a VA and a human is taking part in the interaction. It can be desirable to have VAs or other entities to self-identify during an interaction or conversation, enable advanced functionality with minimal confusion to the participants (e.g., entities) taking part in the interaction or conversation, and join or release participants from one side of an interaction or conversation (e.g., a VA interaction or conversation). Also, when a VA is utilized on one side of a conversation, it can be desirable to maintain a number of state and interaction mechanisms (e.g., complex state and interaction mechanisms) for all parties of the conversation so that issues relating to context, privileges, and consent can be accurately maintained.

To that end, techniques for managing virtual assistants (VAs) in interactions with communication devices (and associated users) and/or other VAs. A communication management component (CMC) can track an interaction between a VA and a communication device associated with a user and/or another VA with regard to an event (e.g., vehicle accident, potential purchase of a product or service, medical situation or emergency, legal or criminal situation, . . . ). The CMC can analyze information relating to the interaction to determine a context of the interaction. The CMC can manage the VA, the other VA, the involvement of the communication device in the interaction, and/or the involvement of another communication device in the interaction, based at least in part on the context. For instance, based at least in part on the context (e.g., the context at a given time during the interaction), the CMC can determine whether the VA is to communicate with the communication device associated with a user, whether the VA is to communicate with another VA, whether the communication device associated with the user is to communicate with another communication device associated with another user, or a combination thereof. As the interaction continues, if the CMC determines that the context has changed, the CMC can determine whether there is to be a change in the participants (e.g., VA, communication device) in the interaction.

When indicated by the context and defined communication management criteria, the CMC can modify characteristics associated with the VA (e.g., speed or cadence of verbal words being presented by the VA to the communication device of the user, a tone or inflection of a virtual or emulated voice of the VA, . . . ) to enhance the interaction. For example, if, based at least in part on the context, the CMC determines that the user is having difficulty in responding to questions presented by the VA, and such difficulty is determined to be due in part to the speed or cadence of the verbal words being presented by the VA to the communication device of the user, the CMC can determine that the speed or cadence is to be modified (e.g., to decrease the speed of presentation of verbal words and/or to adjust the cadence) to facilitate having the VA present the verbal words to the communication device of the user at a speed or using a cadence that enhances (e.g., improves) the ability of the user to understand such verbal words (e.g., questions) and respond to the questions presented by the VA.

In some embodiments, when another communication device or another VA enters the interaction in progress, the CMC can determine interaction update information, based at least in part on the tracking of the interaction (e.g., tracking of information relating to the interaction) and the context, and can communicate the interaction update information to the other communication device (and associated other user) or other VA.

These and other aspects and embodiments of the disclosed subject matter will now be described with respect to the drawings.

Referring now to the drawings, FIG. 1 illustrates a block diagram of an example system 100 that can manage VAs in interactions with users (e.g., communication devices and associated users), other VAs, or other entities (e.g., software-based entities, components, or devices), in accordance with various aspects and embodiments of the disclosed subject matter. The system 100 can comprise a communication device 102 that can be associated with a user 104. A communication device (e.g., communication device 102) can be, for example, a mobile and/or wireless communication device, such as a mobile phone, a landline or wireline phone, an electronic notebook, an electronic pad or tablet, an electronic gaming device, a personal digital assistant (PDA), electronic bodywear (e.g., electronic or smart glasses, electronic or smart watch) a computer, a set-top box, or other type of communication device that can operate and communicate in a communication network environment of a communication network 106 of the system 100.

The communication network 106 can comprise a radio access network (RAN) (not shown) that can comprise or be associated with a set of base stations (e.g., access points (APs)) (not shown) that can serve communication devices (e.g., 102) located in respective coverage areas served by respective base stations in the communication network 106. In some embodiments, the RAN can be a cloud-RAN (C-RAN) that can be located in or associated with a cloud computing environment, comprising various cloud network components of the communication network 106.

The respective base stations can be associated with one or more sectors (not shown), wherein respective sectors can comprise respective cells. The cells can have respective coverage areas that can form the coverage area covered by the one or more sectors. The respective communication devices (e.g., 102) can be communicatively connected to the communication network 106 via respective wireless or wireline communication connections with one or more of the respective cells.

The system 100 also can comprise a VA 108 that can be associated be an entity 110 (e.g., business entity, product or service provider, person, medical provider, or law enforcement, . . . ). In accordance with various embodiments, the VA 108 can be, can comprise, can be associated with, or can be integrated with a communication device. The VA 108 (and/or associated communication device) can be associated with (e.g., communicatively connected to) the communication network 106. It is to be appreciated and understood that, while the disclosed subject matter is typically described with regard to VAs, another type of software-based entity can be employed to perform the functions of the VAs, as described herein. It is to be appreciated and understood that, while some aspects of the disclosed subject matter are described where the user 104 can use the communication device 102 for communication (e.g., transmission, reception) of information (e.g., interaction-related and/or event-related information) to or from another device (e.g., another communication device, a VA, . . . ), in certain aspects of the disclosed subject matter, the user 104 can communicate information using, and can receive information from, the VA 108 (e.g., by speaking into an interface of or associated with the VA 108, by receiving (e.g., hearing, viewing) information presented via an interface of or associated with the VA 108). For example, a VA 108 can be associated with (e.g., integrated with, attached to) a vehicle of the user 104, wherein the user can use (e.g., communicate using) the VA 108 with regard to one or more services that can be provided using or facilitated by the VA 108.

A VA (e.g., 108) can be a domain-specific VA or can be a generalized (or at least more generalized) VA. For example, a domain-specific VA can be created and utilized to provide products or services for one or a relatively small subset of domains (e.g., a VA that provides or facilitates providing food-related products or services; a VA that provides or facilitates providing video and/or audio content-related products or services; a VA that provides or facilitates providing sports-related products or services; . . . ). As another example, a generalized (or more generalized) VA can be created and utilized to provide products or services for all domains or at least a relatively large subset of domains. The disclosed subject matter can enable the use of VAs to act as intermediaries and/or navigators for and on behalf of users and/or other entities, for example, with regard to interactions (e.g., transactions).

The system 100 can include a communication management component 112 (CMC) that can manage (e.g., control) interactions and communications between communication devices (e.g., communication device 102) and VAs (e.g., VA 108), between a communication device (e.g., communication device 102) and another communication device (e.g., communication device 114), between a VA (e.g., VA 108), and another VA (e.g., VA 116), etc., in accordance with defined communication management criteria. The CMC 112 can monitor and track an interaction between participants (e.g., communication device 102 and associated user 104, VA 108, . . . ) to determine a context of the interaction, and can manage the interactions and communications between the participants based at least in part on the context of the interaction. In accordance with various embodiments, the CMC 112 can be a stand-alone unit (as depicted in FIG. 1), can be part on a VA (e.g., VA 108), can be part of another device or component, or can be distributed among various devices or components.

For instance, the CMC 112 can monitor and track an interaction between the VA 108 and the communication device 102 with regard to an event. The event can be or relate to, for example, a vehicle accident (e.g., vehicle accident involving the user 104), a potential purchase of a product or service, another type of transaction, a medical situation or emergency (e.g., injury or medical condition or emergency involving the user 104 or another person), a legal or criminal situation (e.g., theft, robbery, assault, or homicide), or another type of event. The CMC 112 can receive, obtain, or generate information relating to the interaction. For instance, the CMC 112 can receive or obtain information relating to the interaction from the VA 108, communication device 102, and/or another source(s) (e.g., sensors), based at least in part on the tracking of the interaction. The CMC 112 also can generate interaction-related information based at least in part on the tracking of the interaction and/or the received or obtained interaction-related information. The interaction-related information can comprise event information relating to the event, information (e.g., event or other information) exchanged between the participants (e.g., communication device 102 (and associated user 104), VA 108) of the interaction, characteristics of the VA 108 during the interaction, characteristics of the user 104 or communication device 102 during the interaction, historical information regarding the VA 108 and/or communication device 102 (and/or user 104), and/or other desired information relating to the interaction.

The CMC 112 can analyze the information relating to the interaction to determine a context of the interaction. For instance, as part of determining the context of the interaction, the CMC 112 can analyze the interaction-related information to determine whether the exchange of information (e.g., event information) between the VA 108 and the communication device 102 is proceeding at a desirable (e.g., acceptable, suitable, optimal, or sufficiently fast) pace or is proceeding at an undesirable (e.g., unacceptable or unduly slow) pace, whether or not the user 104 appears to be having difficulty in understanding the verbal words (e.g., audible words) presented by the VA 108 to the user 104 via the communication device 102, whether or not the VA 108 appears to be having difficulty in understanding the verbal words communicated by the user 104, via the communication device 102, to the VA 108. The CMC 112 also can analyze the interaction-related information, as part of determining the context of the interaction, to determine the status or progress of the interaction, what event information has been exchanged or collected, what event information is still desired (e.g., to otherwise complete the tasks associated with the interaction, to complete an insurance claim, or to complete a transaction), what type of information (e.g., event information, consent from the user 104, . . . ) is desired to be obtained next or within a defined amount of time (e.g., in the near future) in the interaction, characteristics of the VA 108 during the interaction, characteristics of the user 104 or communication device 102 during the interaction, and/or relevant historical data or characteristics regarding the VA 108 and/or communication device 102 (and/or user 104).

The characteristics of the VA 108 can comprise, for example, a speed (e.g., rate) or cadence of verbal words being presented by the VA 108 to the communication device 102 associated with the user 104, a tone or inflection of a virtual or emulated voice being presented by the VA 108, a volume of the virtual or emulated voice being presented by the VA 108, a language or dialect of the virtual or emulated voice being presented by the VA 108, and/or a vocabulary level of the virtual or emulated voice being presented by the VA 108. The characteristics of the user 104 can comprise, for example, a focus of attention of the user 104 (e.g., whether the user 104 is focused on the interaction or is focused, or partially focused, on something else), a mood (e.g., perceived or determined mood) of the user 104 (e.g., mood: mad, happy, jovial, irritated, upset, excited, . . . ), status, including health status, of the user 104 (e.g., healthy, injured, conscious, unconscious, responsive, non-responsive, heart rate, blood pressure, . . . ), biometric or physical information of the user 104 (e.g., facial expression, eye focus or movement, movement or location of hands or legs, . . . , of the user 104), location of the user 104 relative to the location of the event, gender of the user 104, age of the user 104, demographic information associated with the user 104, and/or other characteristics of the user 104.

The CMC 112 can manage the participants (e.g., communication device(s), VA(s)) of the interaction during the interaction, including managing (e.g., determining) when a device or entity enters (or actively re-enters) the interaction to become a participant (e.g., an active participant) or leaves the interaction (e.g., exits the interaction or becomes an inactive or passive member associated with the interaction), based at least in part on the context. For example, based at least in part on the context (e.g., the context determined by the CMC 112 at a particular time during the interaction), the CMC 112 can determine whether the VA 108 is to communicate with the communication device 102 associated with a user 104, whether the VA 108 is to communicate with another VA (e.g., VA 116), whether the communication device 102 associated with the user 104 is to communicate with another communication device (e.g., communication device 114) associated with another user (e.g., user who is or is associated with entity 110), or a combination thereof. As the interaction continues, if the CMC 112 determines that the context has changed (e.g., at a subsequent time), the CMC 112 can determine whether there is to be a change in the participants (e.g., VA(s), communication device(s)) in the interaction.

When indicated by the context and the defined communication management criteria, the CMC 112 can modify characteristics associated with the VA 108 (e.g., speed or cadence of verbal words being presented by the VA 108 to the communication device 102 of the user 104, a tone or inflection of a virtual or emulated voice of the VA 108, . . . ) to enhance the interaction. For example, if, in determining the context, the CMC 112 determines that the user 104 is having difficulty in responding to statements or questions (e.g., event-related statements or questions) presented by the VA 108, and such difficulty is determined to be due in part to the speed or cadence of the verbal words being presented by the VA 108 to the communication device 102 of the user 104, the CMC 112 can determine that the speed or cadence is to be modified (e.g., to decrease the speed of presentation of verbal words and/or to adjust the cadence) to facilitate having the VA 108 present the verbal words to the communication device 102 of the user 104 at a speed or using a cadence that enhances (e.g., improves) the ability of the user 104 to understand such verbal words (e.g., statements or questions) and respond to the statements or questions presented by the VA 108.

If, however, in determining the context, the CMC 112 determines that the user 104 is readily (e.g., quickly) understanding and responding to questions (e.g., event-related questions) presented by the VA 108, the CMC 112 can determine that the speed can be modified to increase the speed of presentation of verbal words to facilitate having the VA 108 present the verbal words to the communication device 102 of the user 104 at a speed that enhances (e.g., improves) the interaction (e.g., by enabling the conversation between the user 104 and the VA 108 to proceed at a faster pace) while still enabling the user 104 to understand the verbal words (e.g., statements or questions) being presented by the VA 108 and respond to the statements or questions presented by the VA 108.

As another example, in determining the context, the CMC 112 can determine that the user 104 is speaking, or is primarily speaking, in a different language (e.g., Spanish) than the VA 108 (e.g., using a virtual or emulated voice presenting words in English), and that the user 104 is having some difficulty in responding to the questions or statements presented by the VA 108. Accordingly, based at least in part on such context, the CMC 112 can determine that the language used by the VA 108 to present information is to be modified to the language being spoken, or primarily spoken, by the user 104.

As still another example, in determining the context, the CMC 112 can determine that the user 104 is speaking at a lower vocabulary level (e.g., 4th grade vocabulary level) than the VA 108 (e.g., using a virtual or emulated voice to present words at an 8th grade vocabulary level), and that the user 104 is having some difficulty in understanding and/or responding to the questions or statements presented by the VA 108. Accordingly, based at least in part on such context, the CMC 112 can determine that the vocabulary level used by the VA 108 to present information (e.g., in verbal or written word form) is to be modified to a lower vocabulary level that corresponds or substantially corresponds to the vocabulary level determined for the user 104.

In yet another example, if the user 104 is unconscious, injured, and/or otherwise incapable of communicating effectively during an interaction, the VA 116 (e.g., via one or more sensors (e.g., camera, microphone) of the VA) and/or sensors associated with the VA 116 or vehicle of the user 104 can detect that the user 104 is unconscious, injured, and/or otherwise incapable of communicating effectively during the interaction. The CMC 112 or VA 116 can analyze such sensor data, and based at least in part on the analysis results, can determine a context that indicates the user 104 is unconscious, injured, and/or otherwise incapable of communicating effectively during the interaction. The VA 116 (e.g., on its own or as managed by the CMC 112) can determine a responsive action for the VA 116 to take or perform based at least in part on such context, wherein the responsive action can comprise, for example, contacting an emergency or medical service, a law enforcement agency, and/or a relative of the user 104 and providing the emergency or medical service, law enforcement agency, and/or relative information regarding the status (e.g., health status) or the user 104, location of the user 104, and/or other relevant information.

In some embodiments, when another communication device (e.g., communication device 114) or another VA (e.g., VA 116) enters the interaction while in progress, the CMC 112 can determine interaction update information, based at least in part on the tracking of the interaction (e.g., tracking of information relating to the interaction) and the context (e.g., context at the time the other communication device or VA is entering the interaction). The CMC 112 can communicate the interaction update information to the other communication device (e.g., communication device 114), and associated other user (e.g. user that is or is associated with entity 110), or other VA (e.g., VA 116) to enable the other user or other VA to be up to date regarding what has occurred during the interaction, what information (e.g., information determined to be relevant) has been exchanged during the interaction, and/or the current status or progress of the interaction, etc.

As another example, if the user 104 exits the interaction or otherwise does not actively participate in the interaction for a period of time, the CMC 112 can track the interaction between the participants (e.g., VA 108, VA 116, and/or the other user) during that period of time. If the CMC 112 determines that the user 104 is to re-enter the interaction or otherwise become an active participant in the interaction, the CMC 112 can determine interaction update information based at least in part on the tracking of the interaction (e.g., tracking of the interaction during that period of time and/or other relevant time period) and the context (e.g., context at the time the user 104 is to re-enter the interaction and/or actively participate in the interaction). The CMC 112 can communicate the interaction update information to the VA 116 or communication device 102, wherein the VA 116 (e.g., via an interface(s), such as a display screen and/or speaker, of the VA 116) or communication device 102 (e.g., via a display screen and/or speaker of the device 102) can present the interaction update information to the user 104 to update the user regarding the interaction.

In certain embodiments, a user (e.g., user 104) can be passively participating in an interaction and having a VA (e.g., VA 116) act on behalf of the user during the interaction with one or more other participants (e.g., VA 108 and/or the other user). As desired (e.g., as desired by the user 104), and/or as determined by the CMC 112 based at least in part on the context (e.g., context of the user 104), the CMC 112 can determine interaction update information during the time the user (e.g., user 104) is passively participating in the interaction, and, during that time (e.g., on a continual or rolling basis) can communicate the interaction update information to the VA (e.g., VA 116) or communication device (e.g., communication device 102) associated with the user for presentation (e.g., visually via a display screen and/or audibly via a speaker) to the user to keep the user updated regarding the interaction as things (e.g., information is exchanged, tasks are completed, or participants in the interaction change, . . . ) are occurring in the interaction (e.g., in real time or substantially real time). The user (e.g., user 104) can view or listen to the interaction update information, via the VA or communication device, to keep updated regarding the interaction. For instance, based at least in part on tracking the interaction, including tracking attention or focus of the user (e.g., user 104) to the interaction, the CMC 112 can determine a context that can indicate that, while the user is not actively participating in the interaction (e.g., by talking in the conversation), the user is paying at least some attention to what is transpiring during the interaction. Accordingly, the CMC 112 can determine that interaction update information is to be sent to the user via the VA (e.g., VA 116) or communication device (e.g., communication device 102).

The CMC 112 also can manage VAs (e.g., VA 108 and VA 116) during VA-to-VA communication to enable enhanced and efficient communication of information (e.g., event-related information or other interaction-related information). For instance, in connection with a particular type of event (e.g., vehicle accident), VA 108 and VA 116 can be communicating information relating to the event between each other. Based at least in part on the particular type of event, the VA 108 and VA 116, for example, employing an algorithm, information list, task list, and/or checklist, etc., can each know what items of information are to be exchanged between each other during the interaction. Without a request or prompting for a next item of information by the VA 108, the VA 116 can provide (e.g., communicate to) the VA 108 the next item of information that can be desired by the VA 108, in accordance with the algorithm, information list, task list, and/or checklist, etc., and/or vice versa, without a request or prompting for a next item of information by the VA 116, the VA 108 can provide (e.g., communicate to) the VA 116 the next item of information that can be desired by the VA 116, in accordance with the algorithm, information list, task list, and/or checklist, etc.

For instance, an algorithm or list (e.g., information list, task list, and/or checklist) relating to a vehicle accident indicates that information be provided by a local VA (e.g., VA 116) associated with the vehicle to a remote VA (e.g., VA 108) in the following order: name of vehicle owner, name of driver of vehicle, address of vehicle owner, location of vehicle accident, etc. Based at least in part on the algorithm or list, which can be known by the local VA and remote VA, the local VA, without a request from or prompting by the remote VA to provide such items of information to the remote VA, the local VA (e.g., VA 116) can communicate (e.g., automatically communicate) such items of information in that order (e.g., name of vehicle owner, name of driver of vehicle, address of vehicle owner, location of vehicle accident, etc.) to the remote VA (e.g., VA 108), in accordance with the algorithm or list. This can enhance (e.g., reduce the amount of time and resources) utilized by VAs to exchange information relating to an event.

Also, if, for example, prior to the VA-to-VA communication, the user 104 already had contacted the remote VA (e.g., VA 108) or another user (or communication device (e.g., 114) of the other user) associated with the remote VA and provide the remote VA or other user certain items of information such as the name of the driver of the vehicle and location of the vehicle accident, during the subsequent VA-to-VA communication, the local VA (e.g., VA 116) and remote VA (e.g., VA 108) can already know that those certain items of information were provided (e.g., based on the CMC 112 managing the local VA and remote VA). Accordingly, based at least in part on the algorithm or list, and based on the knowledge regarding the certain items of information that already were provided by the user 104, the local VA (e.g., VA 116), without a request from or prompting by the remote VA to provide the remaining items of information to the remote VA (e.g., VA 108), the local VA can communicate (e.g., automatically communicate) the remaining items of information in the proper order (e.g., name of vehicle owner, address of vehicle owner, etc.) to the remote VA (e.g., VA 108), while bypassing the certain items of information that already were provided by the user 104, in accordance with the algorithm or list. This also can enhance (e.g., reduce the amount of time and resources) utilized by VAs to exchange information relating to an event. While this example relates to one VA (e.g., a local VA) providing items of information to another VA (e.g., a remote VA) without a request or prompt from the other VA to provide the items of information, the providing of items of information also can be bi-directional in that the local VA can communicate a first subset of items of information to the remote VA without a request or prompt from the remote VA for the local VA to communicate the first subset of items of information to the remote VA, and the remote VA can communicate a second subset of items of information to the local VA without a request or prompt from the local VA for the remote VA to communicate the second subset of items of information to the local VA, in accordance with an applicable algorithm or list.

The CMC 112 and one or more VAs (e.g., VA 116 and/or 108) also can perform various tasks simultaneously, substantially simultaneously, or in parallel. For example, when a vehicle accident has occurred and the user 104 has been injured, the CMC 112 can manage the VAs to have one VA (e.g., VA 116) contact and interact with emergency medical services (EMS) or other medical personnel (e.g., a VA or communication device of EMS or other medical personnel), another VA (e.g., VA 108) contact and interact with the insurance company of the user 104 (e.g., a VA or communication device of the insurance company) to notify the insurance company regarding the accident and initiate an insurance claim, still another VA contact and interact with law enforcement (e.g., a VA or communication device of law enforcement) to notify law enforcement regarding the accident (e.g., location and details of the accident), and yet another VA contact and interact with a towing company (e.g., a VA or communication device of the towing company) to request that the towing company come to the scene of the accident and tow the vehicle, wherein the respective VAs can perform their respective tasks simultaneously, substantially simultaneously, or in parallel. In some embodiments, one VA (e.g., VA 116) can perform multiple tasks simultaneously, substantially simultaneously, or in parallel. For example, with regard to the vehicle accident example, one VA (e.g., VA 116) can perform two or more of the aforementioned tasks (e.g., contact and interact with EMS or other medical personnel, contact and interact with the insurance company, contact and interact with law enforcement, and/or contact and interact with the towing company).

Figure 2:
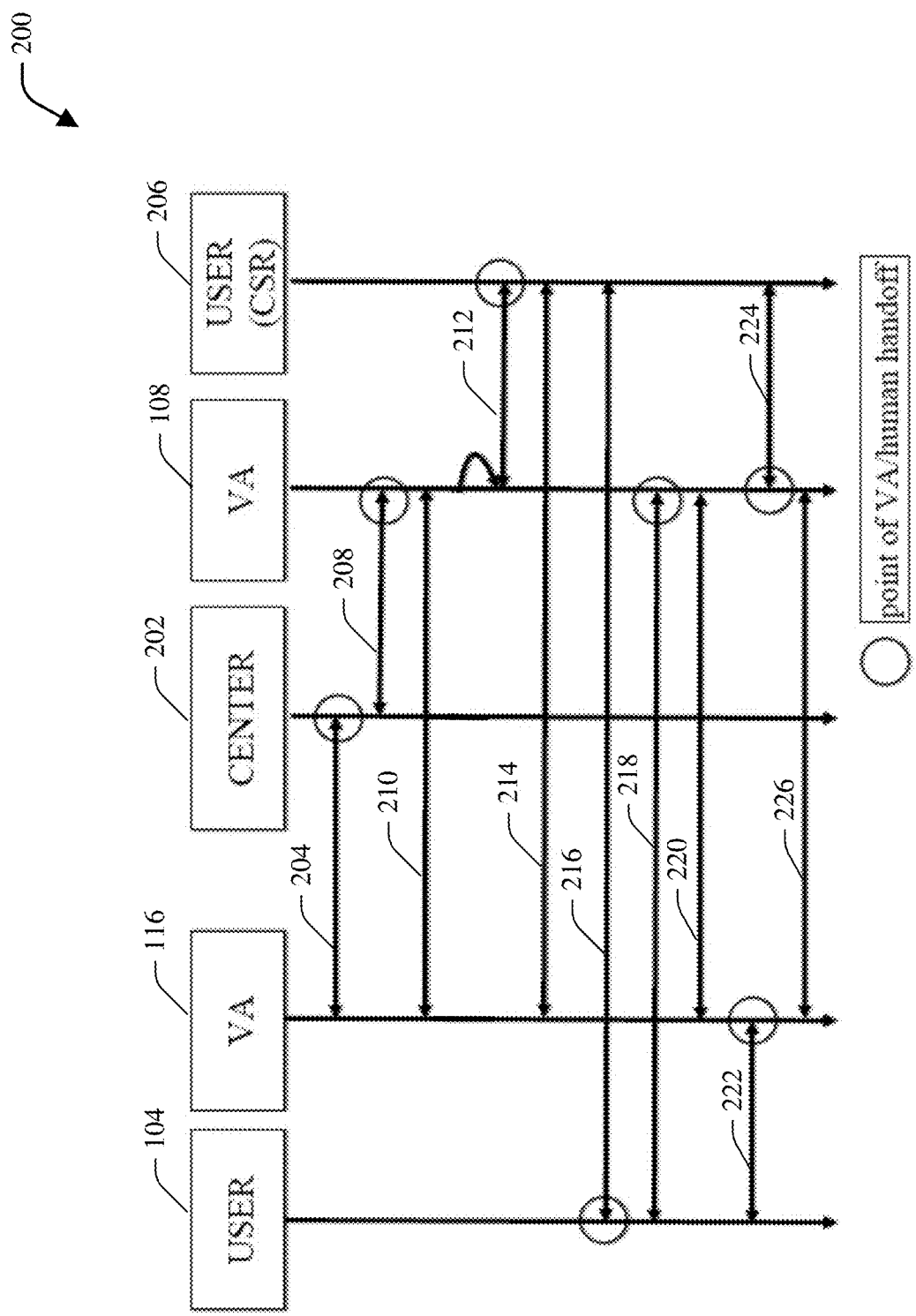
FIG. 2 depicts a diagram of an example interaction between communication devices, VAs, and users or other entities, in accordance with various aspects and embodiments of the disclosed subject matter.

Other aspects and embodiments of the disclosed subject matter will be described with regard to the other figures (and/or FIG. 1). Referring to FIG. 2 (along with FIG. 1), FIG. 2 depicts a diagram of an example interaction 200 between communication devices, VAs, and users or other entities, in accordance with various aspects and embodiments of the disclosed subject matter. The example interaction 200 can relate to, for example, a vehicle accident involving the user 104 and the user's vehicle (not shown in FIG. 1 or 2).

In some embodiments, one or more sensors (not shown in FIG. 1 or 2) of the vehicle can sense or detect that the vehicle has been involved in an accident. The one or more sensors can be associated with a VA 116, which can be associated with the user 104 (e.g., as user or owner of the vehicle) and an entity 118 (e.g., an entity that can provide a service comprising the VA 116). Additionally or alternatively, the user 104 can detect that the vehicle has been involved in an accident. The one or more sensors can trigger (e.g., initiate) an outgoing VA interaction, or the user 104 (e.g., driver or passenger of vehicle) can initiate the outgoing VA interaction, by the VA 116 to a center system 202 (e.g., call center system associated with an insurance company, emergency service, medical provider, law enforcement agency, vehicle or towing service, . . . ), wherein the center system 202 can comprise or be associated with the CMC 112, which can manage communications between communication devices, users or other entities, VAs, etc. (e.g., with regard to the vehicle accident). The VA 116 can be a VA that is located in, attached to, or integrated with the vehicle, for example. In some embodiments, the VA can be part of the communication device 102 of the user 104.

As indicated at reference numeral 204, in response to the initiation of the VA interaction, the VA 116 can contact the center system 202 and can identify itself to the center system 202, including the CMC 112, as a VA (e.g., as VA 116). In some embodiments, the VA 116 initially can be in contact with a user 206 (e.g., user associated with entity 110). In other embodiments, the VA 116 initially can be in contact with another VA, such as VA 108. In response to being contacted by the VA 116, the user 206 or the CMC 112 associated with the center system 202 can generate a new ticket (e.g., an insurance claim ticket, a service claim ticket, a work ticket, or a response ticket, . . . ). If the initial contact by the VA 116 was with a user 206 associated with the center system 202, the user 206 or the CMC 112 can facilitate creating the VA 108 (e.g., service VA or bot), including setting initial (e.g., default or initial particular) characteristics associated with the VA 108, based at least in part on the information (e.g., current and/or historical information) relating to the interaction (e.g., to that point in time). As indicated at reference numeral 208, the center system 202, via the CMC 112 or the user 206, can provide (e.g., communicate or present) the interaction-related information (e.g., to that point in time), including event-related information relating to the event (e.g., vehicle accident), to the VA 108.

As indicated at reference numeral 210, the VA 116 associated with the vehicle can communicate with the VA 108 associated with the center system 202 to exchange data (e.g., event-related data). In some embodiments, the communication of data between the VA 116 and VA 108 can be in a non-verbal form (e.g., communication of digital data via a non-audio data communication channel). Such communication of data in non-verbal form (e.g., data traffic) can enable the exchange of information (e.g., event-related information and other interaction-related information) at a relatively high speed (e.g., typically a higher speed of communication of information than the speed that such information can be communicated in verbal or audio form).

In other embodiments, if a data communication channel is not available for VA-to-VA data communications, or if only a single communication channel is available (e.g., for communications relating to the interaction), the communication of data between the VA 116 and VA 108 can be in a verbal word form via an available communication channel (e.g., communication via a channel that supports presentation of verbal/audio words. In such instance, the CMC 112 can control (e.g., modify) the characteristics of the VA 108 and/or VA 116 (e.g., if VA 116 also is being managed by the CMC 112), and/or the respective VAs 108 and 116 can modify their respective characteristics, to exchange information at a higher speed (e.g., at a highest speed achievable via the communication channel). For example, the CMC 112, and/or the respective VAs 108 and 116, can modify (e.g., increase) the speed of presentation of verbal words by the VA 108 and/or VA 116, can modify the cadence of the verbal words being presented by the by the VA 108 and/or VA 116 to enhance (e.g., increase the speed of) the conversation between the VA 108 and VA 116. To facilitate enhancing the conversation between VA 108 and VA 116, the CMC 112 can manage, and/or the VA 108 and VA 116 can negotiate with each other or automatically discover, the characteristics (e.g., word speed, voice cadence, voice inflection, voice tone, language, vocabulary level, syntax, . . . ) of VA 108 and VA 116 to employ to exchange information to enhance the conversation between VA 108 and VA 116.

During the example scenario of the example interaction 200, the context can change based at least in part on what has occurred during the interaction 200. The CMC 112 can determine the respective contexts at respective times during the interaction 200, and detect or determine when the context of the interaction 200 has changed, and can manage the interaction 200, including controlling operation of, or participation of, the VA 108 and other participants (e.g., user 104 (and/or associated communication device 102), and/or VA 116) or participants-to-be (e.g., communication device 114 and user 206 associated with the entity 110) in the interaction 200, in accordance with the defined communication management criteria. For example, there can be instances where, during the interaction 200, it can be desirable (e.g., wanted, suitable, advantageous, or necessary, . . . ) for another user 206 (e.g., a human user, such as a customer service representative (CSR), associated with entity 110) to enter the interaction 200 to obtain additional information from the user 104, validate or verify information (e.g., event-related information and/or information relating to the user 104) with the user 104, and/or obtain consent from the user 104 (e.g., to take a particular action). Based at least in part on the results of analyzing the interaction-related information of the interaction 200, the CMC 112 can determine a context where it can be desirable for such other user to enter the interaction 200 to obtain additional information from the user 104, validate or verify information with the user 104, and/or obtain consent from the user 104.

In that regard, as indicated by reference numeral 212, the CMC 112 can manage the interaction 200 to have the user 206 (e.g., CSR), using communication device 114, enter the interaction 200, and join the conversation, to obtain additional information regarding the event and/or the user 104. In some embodiments, as such other user 206 and associated communication device 114 enter the interaction, the VA 108 (e.g., service VA) can introduce and/or identify such other user 206 and associated communication device 114 to the user 104 and/or VA 116 (e.g., vehicle VA), or such other user 206 can self-identify himself or herself, including self-identifying that he or she is a human being (as opposed to a VA).

In some embodiments, as indicated by reference numeral 214, the other user 206, using communication device 114, initially can interact and communicate with the VA 116 to obtain additional information relating to the event and/or user 104 that the VA 116 is able to provide. As indicated at reference numeral 216, at certain times, the other user 206, using communication device 114, also can interact and communicate with the user 104, who can use an interface on the VA 116 (and/or communication device 102), for example, to verify or validate the additional information obtained from the VA 116 and/or other information (e.g., information previously obtained before the other user entered the interaction 200, but not yet verified or validated by the user 104). In accordance with various embodiments, the CMC 112 and/or the other user 206 can imply that the user 104 has given consent for the other user 206 and associated communication device 114 to communicate with the VA 116 to obtain the additional information, or the other user 206 can request that the user 104 explicitly give consent for the other user 206 and associated communication device 114 to communicate with the VA 116 to obtain the additional information.

In some instances, the VA 116 can indicate to the user 104 that additional information is desired from the user 104, and the user 104 can initially refuse or decline to give consent to provide the additional information. In such instances, the other user 206, using communication device 114, can communicate with the user 104, who can use the interface of VA 116 (or communication device 102) to communicate with the other user 206, wherein the other user 206 can confirm to the user 104 that the additional consent and information is desired (e.g., required or necessary).

The user 104 can accept the request for consent and additional information from the other user 206, but, as indicated at reference numeral 218, can indicate a preference for continued VA interaction, wherein the other user 206 can hand off the conversation to the VA 108, which can re-identify in and/or re-enter the interaction 200 (e.g., conversation). As indicated at reference numeral 220, the VA 116 can re-identify in and/or re-enter the interaction 200 (e.g., conversation), and the VA 108 can interact with the VA 116 to exchange further information (e.g., event-related and/or other interaction-related information), wherein the VA 108 can be proxied or direct to the other user 206 associated with the entity 110.

In some embodiments, the VA 116 also can continue to interact with the user 104, for example, to keep the user 104 updated regarding the status or progress of the interaction 200. The VA 116 (or the CMC 112, if the CMC 112 manages the VA 116) can modify characteristics (e.g., speed of presentation of verbal words, voice inflection, amount of detail of information presented) of the VA 116 based at least in part on a determined context of the interaction 200, including a context of the user 104 (e.g., based on whether the user 104 is actively paying attention to the conversation or is merely passively following the conversation; based on whether the user 104 appears to be engaging in other activity unrelated to the interaction 200). For example, the VA 116 can be adjusted to present (e.g., communicate) verbal words at a first speed, if the user 104 is determined to be actively paying attention to and/or engaging in the conversation of the interaction 200; or the VA 116 can be adjusted to present verbal words at a second (e.g., different) speed, if the user 104 is determined to be not be paying attention or merely passively following the conversation of the interaction 200. The VA 116 also can have characteristics adjusted to present, via verbal words, different amounts of information (e.g., interaction update information) to the user 104 based at least in part on the context of the user. For example, if the user 104 is determined to be actively paying attention to and/or engaging in the conversation of the interaction 200, the characteristics of the VA 116 can be adjusted to provide more information (e.g., interaction update information) to the user 104 than the amount of information the VA 116 would provide if the user 104 is determined to be not be paying particular attention or is merely passively following the conversation of the interaction 200. In certain embodiments, additionally or alternatively, the VA 116 can provide updates (e.g., non-verbal interaction update information) regarding the interaction 200 to the user 104 via a display screen of the VA 116 or via a message(s) (e.g., text or instant message(s)) to the communication device 102.

The VA 108 and VA 116 can continue to communicate information to each other. During this time, as desired, the user 104, using an interface of the VA 116 or communication device 102, can continue to communicate with the other user (e.g., CSR), wherein the other user can be using communication device 114 or an interface of the VA 108 to communicate with the user 104.

At some point in the conversation, the user 104 (e.g., driver or passenger of the vehicle) can desire to allow the VA 116 to take over the remainder, or at least virtually the rest, of the conversation of the interaction 200 on behalf of the user 104. As indicated at reference numeral 222, the user 104 can hand off future consent of the user 104 to the VA 116 to enable the VA 116 to give consent and/or provide certain information (e.g., information for which consent is desired), on behalf of the user 104, to the VA 108 and/or the other user 206. For example, the user 104, using an interface of the VA 116 or the communication device 102, can escalate the local privileges of the VA 116 to enable the VA 116 to give consent and/or provide certain information, on behalf of the user 104, to the VA 108 and/or the other user 206.

As indicated at reference numeral 224, as desired, the other user 206 can handoff the conversation (e.g., exchange of information) to the VA 108, for example, to have the VA 108 act on behalf of the other user 206 to address any remaining issues or details relating to the event. As indicated at reference numeral 226, VA 108 and VA 116 can continue to communicate and exchange information with each other, for example, to complete any remaining tasks relating to the event, wherein such communication between the VA 108 and VA 116 can be performed in the background. The CMC 112 can control the VA 108 and/or VA 116 (if the CMC 112 is managing VA 116) to control the mode (e.g., verbal communication, or non-verbal communication) of exchange of information and/or characteristics of the VA 108 and/or VA 116. For example, the CMC 112 can manage the VA 108 and/or VA 116 to have the VA 108 communicate and exchange information with VA 116 using non-verbal communication via a data communication channel, which typically can be performed significantly quicker than communicating such information using verbal communications.

In still other embodiments, an entire interaction (and exchanges of information), or a desired portion of the interaction, between one or more VAs (e.g., VA 108, and/or VA 116), one or more users (e.g., user 104, and/or user 206) and/or one or more associated communication devices (e.g., communication device 102, and/or communication device 114), and/or one or more other devices or entities can occur in a virtual reality (VR) and/or augmented reality (AR) setting(s). For example, instead of a real accident or event setting (e.g., purchase of a product or service, social or business interaction, medical or health related event setting, or legal or law enforcement related event setting, . . . ), one or more users (e.g., user 104, and/or user 206) can be interacting in a virtual environment (e.g., a VR and/or AR environment), such as a racing simulator, customer care or other training program, or other synthetic environment. With no loss or modification of functionality, the CMC 112 can connect and manage the VA(s) (e.g., VA 108, and/or VA 116), and can manage the interaction (e.g., interaction between the participants or participants-to-be of the interaction), based at least in part on (e.g., according to) the context(s) of the interaction (e.g., overall context of the interaction, which can include and/or be based at least in part on the user context(s) of the user(s), VA context(s) of the VA(s), communication device context(s) of the communication device(s), . . . ), such as described in the example interaction in FIG. 2 (along with FIG. 1) and/or as otherwise disclosed or described herein.

Figure 3:
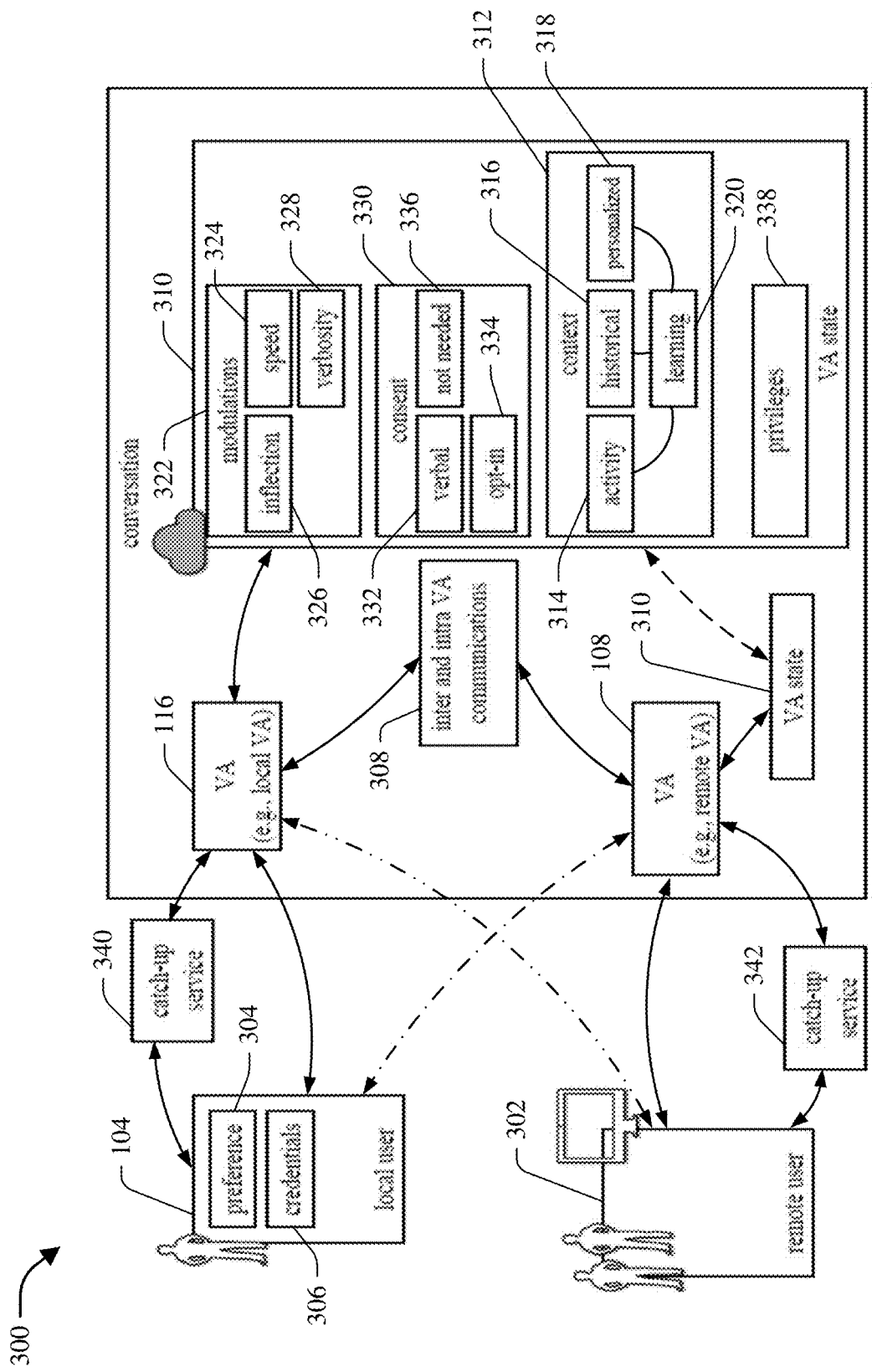
FIG. 3 depicts a block diagram of an example interaction flow, in accordance with various aspects and embodiments of the disclosed subject matter.

Referring to FIG. 3 (along with FIGS. 1 and 2), FIG. 3 depicts a block diagram of an example interaction flow 300, in accordance with various aspects and embodiments of the disclosed subject matter. Various components of the interaction flow 300 can be part of or associated with the system (e.g., system 100). As depicted in the example interaction flow 300, the user 104 can interact with (e.g., communicate with and/or use an interface of) the VA 116, for example, in connection with an event (e.g., vehicle accident). For example, at various times, during the interaction (e.g., interaction 200), the user 104 can interact with the VA 116 to provide information relating to the event to the VA 116 or receive information relating to the event from the VA 116, such as described herein (e.g., with regard to interaction 200).

The interaction between the user 104 and VA 116 (and/or VA 108 or user 302 associated with VA 108 and entity 110) can be managed (e.g., CMC 112, VA 116, and/or VA 108) based at least in part on preferences 304 and/or credentials 306 (e.g., authentication credentials) of the user 104. For instance, the user 104 can indicate, set, or specify one or more preferences 304 of the user 104 with regard to interactions, in general, or this particular interaction (e.g., interaction 200). The one or more preferences 304, for example, can indicate that the user 104 desires, authorizes, and/or consents the VA 116 to act on behalf of the user 104 with regard to certain actions and/or types of information, in connection with communicating with the VA 108, user 302, or other devices or entities; can indicate that there are certain other actions and/or types of information that the user 104 does not desire, authorize, and/or consent the VA 116 to act on behalf of the user 104; can indicate the manner in which the user 104 desires to be kept updated by the VA 116 (or CMC 112, or VA 108) with regard to the interaction (e.g., present certain interaction-related information as the user 104 passively monitors the interaction, while the VA 116 interacts with VA 108 and/or user 302 on behalf of the user 104; or present interaction update information to the user 104 when the user 104 actively re-enters and participates in the interaction); can indicate or select certain desired (e.g., preferred) characteristics (e.g., language, dialect, . . . ) for the VA (e.g., VA 116) to have; and/or can indicate one or more other preferences of the user 104.

At desired times during an interaction, the VA 116 also can interact and communicate with VA 108, wherein inter and intra VA communications of information (e.g., event-related information or other interaction-related information) can be performed by the VA 116 and VA 108 (e.g., as depicted at reference numeral 308). The communications between the VA 116 and VA 108 can be in the form of data traffic (e.g., non-verbal data) that can be communicated between the VA 116 and VA 108 using a data communication channel. If no data communication channel is available, the VA 116 and VA 108 can communicate information in verbal form to each other via an audio communication channel. The VA 116 and VA 108 (e.g., as managed by CMC 112) can enhance communications with each other by adjusting respective VA characteristics (e.g., speed or cadence of presentation of verbal words; inflection or tone of the virtual or emulated voice of the VA; and/or conversation syntax) to enable faster and more efficient communication of information with each other, in accordance with the defined communication management criteria.

During certain times of the interaction, as desired, the VA 108 also can communicate with the user 104 and/or the user 302. For example, there can be instances where the VA 108 desires additional information or consent from the user 104, and the VA 108 can interact and communicate with the user 104 to obtain the additional information or consent, instead of communicating with the VA 116. As another example, the user 302 can interact and communication with the VA 108 to provide information (e.g., event-related information or other interaction-related information) in connection with the VA 108 entering the interaction (e.g., interaction 200) and taking a primary role in communicating with the VA 116 or user 104 during the interaction.

The CMC 112 can manage the operation of the VA 108 (and/or VA 116), including the VA state 310 of the VA 108 (and/or VA 116), based at least in part on the context 312 of the interaction, in accordance with the defined communication management criteria. The CMC 112 can determine the context 312 of the interaction (e.g., interaction 200) based at least in part on activity 314 during the interaction, historical information 316 relating to the participants (e.g., user 104, VA 116, VA 108, and/or user 302) and/or type of event (e.g., vehicle accident, sale of a product or service, medical injury or emergency, event involving law enforcement, . . . ) (e.g., activity and communications by the participants), and personalized information 318, such as information relating to a relationship (e.g., pre-existing relationship) between participants (e.g., between user 104 and VA 108; between VA 108 and VA 116; . . . ). The CMC 112 can learn (e.g., as indicated by reference numeral 320), acquire, and/or track the information regarding the activity 314, historical information 316, and personalized information 318, and can learn (e.g., 320) or determine the context of the interaction (e.g., interaction 200) at a given time during the interaction based at least in part on the activity 314, historical information 316, and personalized information 318. The activity 314 can relate to, for example, respective communications of information between the respective participants, other interactions between the participants (e.g., hand off from a user to a VA, or vice versa; problem with a user understanding or responding to a VA; . . . ), and/or other types of activities of the participants during the interaction.

In connection with managing the VA state 310 of a VA (e.g., VA 108 and/or VA 116), the CMC 112 can manage the characteristics of the VA 108 (and/or VA 116) based at least in part on the context of the interaction. For instance, the CMC 112 can manage the modulations 322 of the VA 108 (and/or VA 116) to adjust or modulate the communication of information between the VA 108 and the user 104 (or user 302) or between the VA 108 and the VA 116 (and/or between the VA 116 and the user 104 or user 302), based at least in part on the context determined for the interaction, to enhance the communications between the respective participants, as more fully described herein. The modulations 322 can comprise or relate to, for example, the speed 324 of the presentation of verbal words to a user (e.g., user 104 or user 302) by a VA (e.g., VA 108 or VA 116) or to a VA (e.g., VA 116) by another VA (e.g., VA 108), an inflection 326 of the verbal words being presented to a user by a VA or to a VA by another VA, a verbosity 328 of the verbal words being presented to a user by a VA or to a VA by another VA, and/or other types of modulations 322 (e.g., modulations comprising or relating to a cadence, vocabulary level, language, and/or dialect of the verbal words being presented by a VA), such as described herein.

In connection with managing the VA state 310 of a VA (e.g., VA 108 and/or VA 116), the CMC 112 can manage the operation of the VA 108 (and/or VA 116) and/or the participation of participants (or potential participants) (e.g., VA 108, VA 116, user 104, or user 302) in the interaction based at least in part on the context, for example, as the context relates to consent 330, including verbal consent 332, opt-in 334, and consent not needed 336. For example, with regard to when verbal consent 332 is desired by a VA (e.g., VA 108) in order to perform an action (e.g., sign (e.g., digitally or verbally sign) a document or statement (e.g., electronic document or statement), initiate a claim (e.g. insurance claim), release medical information regarding a user 104, perform a credit check on the user 104, . . . ) in connection with the interaction, based at least in part on such context, the CMC 112 can manage the VA 108 and/or VA 116 to request that the user 104 actively participate in the interaction (if the user 104 was having the VA 116 act on behalf of the user) and interact with the VA 108 or VA 116 to provide the desired consent of the user 104 (e.g., verbal consent 332 or otherwise consent) to allow the VA to perform the action.

As another example, there can be instances where consent of the user 104 can be on an opt-in 334 basis, wherein the CMC 112 and VA (e.g., VA 108 and/or VA 116) can deem the user 104 as not consenting to a certain action by the VA, unless the user 104 affirmatively or actively opts-in to give consent to such certain action by the VA. Based at least on such context regarding an opt-in 334 with regard to such certain action, the CMC 112 can manage the VA (e.g., VA 108 and/or VA 116) to have the VA request that the user 104 actively indicate whether the user 104 opts-in to allow the VA to take or perform such certain action.

As still another example, there can be instances where consent of the user 104 is not necessary (336) in order for a VA (e.g., VA 108 and/or VA 116) to perform a particular action (e.g., provide certain details regarding the event). Based at least in part on such a context, if the user 104 has been allowing the VA 116 to act on behalf of the user 104, and, on behalf of the user 104, the VA 116 has been interacting and communicating with the VA 108, the VA 116 and/or VA 108 (e.g., as managed by the CMC 112) can perform the particular action without involving the user 104 (e.g., without the user 104 having to actively provide explicit consent to allow the VA to perform the particular action).

In connection with managing the VA state 310 of a VA (e.g., VA 108 and/or VA 116), the CMC 112 also can manage the operation of the VA 108 (and/or VA 116) and/or the participation of participants (or potential participants) (e.g., VA 108, VA 116, user 104, or user 302) in the interaction based at least in part on the context as it relates to privileges 338 granted to a VA (e.g., VA 116) by a user (e.g., user 104). For instance, the user 104 can grant a VA 116 certain privileges to act on behalf of the user 104 during the interaction (e.g., interaction 200). The certain privileges can relate to, for example, what information the VA 116 is permitted to convey to another VA (e.g., VA 108) or user (e.g., user 302) on behalf of the user 104, what actions the VA 116 is permitted to take on behalf of the user 104, and/or what the VA 116 can consent to on behalf of the user 104, etc. The CMC 112 can track and obtain privilege-related information that can indicate the privileges 338 granted to the VA 116, and the CMC 112 can manage the VA 116 (and/or VA 108), and/or the participation the participants (e.g., user 104, user 302, VA 108, VA 116) in the interaction, based at least in part on the privileges 338 granted to the VA 116.

The CMC 112 also can provide catch-up services, including catch-up service 340 and catch-up service 342, to respective users (e.g., user 104, user 302) to keep users up to date regarding the status or progress of an interaction (e.g., interaction 200), for example, when a user has not been actively participating in the interaction. The CMC 112, and/or the VA 108 and/or VA 116, can track what occurs during the interaction, including tracking information exchanged between participants of the interaction (e.g., information exchanged between VAs, information exchanged between a VA and a user), progress that has been made with regard to the performance of tasks associated with the interaction, what tasks remain to be performed in connection with the interaction, the participants in the interaction, and/or other activities associated with the interaction. If a user (e.g., user 104, or user 302) is preparing to enter or re-enter the interaction to actively participate in the interaction or the user otherwise desires an update regarding the interaction, the CMC 112, and/or the VA 108 and/or VA 116, can employ the catch-up service (e.g., catch-up service 340, or catch-up service 342) to determine and generate interaction update information, based at least in part on the context of the interaction and the tracking of what has occurred during the interaction. The VA (e.g., VA 108, or VA 116) can provide the interaction update information to the user, via an interface of the VA (or a communication device associated with the user), to bring the user up to date regarding what has occurred during the interaction.

With further regard to FIG. 1, in another example scenario, an interaction can relate to using VAs (e.g., VA 108, VA 116) to facilitate a purchase of an item. The user 104 can desire to purchase a particular item from a seller entity (e.g., entity 110). On behalf of the user 104, the VA 116 (e.g., a local VA with respect to the user 104) can contact a sales interface for the interaction (e.g., interaction relating to the sale of the item). In this example scenario, the VA 116 initially can interact (e.g., communicate) with a remote sales service, for example, via another user (e.g., sales representative or agent) or a remote automated sales service agent associated with the seller entity. The other user (e.g., sales representative or agent) or remote automated sales service agent can initialize the transaction (e.g., sale) and begin the interaction. The VA 116 can identify itself to the other user or remote automated sales service agent that initially can transfer (e.g., hand off) the interaction with the VA 116 to VA 108 (e.g., a sales VA) associated with the seller entity (e.g., entity 110).

The VA 108 and VA 116 can communicate information (e.g., non-verbal data) between each other via a data communication channel (e.g., a non-verbal or non-vocal channel), wherein the information can relate to the sale of the particular item. As the communication between VA 108 and VA 116 is being performed via the data communication channel, the information typically can be communicated significantly faster than if the information was in the form of verbal words being communicated via an audio communication channel. The CMC 112 can facilitate managing the VA 108 and/or VA 116 (if the CMC 112 is also managing the VA 116) to enable desirably quick communication of the information between VA 108 and VA 116 via the data communication channel, in accordance with the defined communication management criteria.

In this example scenario, the VA 116 can ask the VA 108 one or more questions, wherein the VA 108 is not able to answer some or all of the one or more questions. The CMC 112 can be tracking the interaction and can determine the context of the interaction, wherein the context can indicate that the VA 108 is not able to answer some or all of the one or more questions asked by the VA 116. In some instances of this example scenario, the CMC 112 can determine that the interaction regarding the purchase of the item is to be transferred to a human user (e.g., the other user associated with the entity 110) for further processing of the transaction.

In other example instances of this example scenario, the VA 108 initially can begin to answer or attempt to answer the one or more questions, while the CMC 112 stages (e.g., prepares) or facilitates staging the human user to enter the interaction, wherein the VA 108 at least can be a temporary proxy for the human user to answer or attempt to answer the one or more questions. The CMC 112 can determine and generate interaction update information, comprising a summary or subset of the information relating to the interaction and/or other relevant information (e.g., historical information relating to the user 104, the item being purchased, the relationship between the user 104, VA 116, and/or VA 108, . . . ) based at least in part on the tracking of the interaction, including information communicated between the VA 116 (or user 104) and the VA 108. The CMC 112 can communicate the interaction update information, via an interface (e.g., of communication device 114 or VA 108), to the human user to enable the human user to be updated (e.g., caught up) to the progress or status of the interaction (e.g., progress or status of the sale of the item), to provide the human user with contextual awareness of the historical interaction between the user 104 (and/or VA 116) and the VA 108 (and/or human user or entity 110). The interaction update information also can convey to the human user the next operations or actions associated with the transaction that are to be performed by the VA 108 to continue the conversation, or at least partially continue the conversation, with the VA 116. With the human user brought up to date on the transaction, the VA 108 can hand off, or partially hand off, the performance of the transaction to the human user, wherein the human user can begin interacting and exchanging information with the VA 116 to answer the unanswered question(s) and/or further the progress on the transaction and/or the VA 108 can continue to communicate with the VA 116 (e.g., on a parallel workflow path with the workflow path of the human user interacting with the VA 116) to perform the next operations or actions associated with the transaction (e.g., as further instructed by the human user or backend sales of the entity 110).

In this example scenario, the user 104 can implicitly or explicitly allow the VA 116 (e.g., grant the VA 116 privileges or authority) to execute the purchase of the item on behalf of the user 104. In some embodiments, the user 104 can allow the VA 116 to perform most of the tasks relating to the purchase of the item, but can reserve the final approval of the purchase of the item to the user 104.

As the transaction progresses towards a final sale (or no sale), the CMC 112 can continue to monitor and track the interaction. Based at least in part on a context of the interaction at a given time (e.g., as determined by the CMC 112), the CMC 112 can continue to manage the interaction and the participants (e.g., user 104, VA 108, VA 116, the other user (e.g., human user), . . . ) of the interaction. For instance, as determined appropriate or indicated by a context at a given time, the other user (e.g., remote sales agent) and/or the VA 108 can join or leave the conversation with the VA 116 (and/or the user 104) (e.g., as managed by the CMC 112). At a given time when a particular participant (e.g., the other user, the VA 108, . . . ) joins or re-joins the conversation, the CMC 112 can determine and generate interaction update information (e.g., summary or subset of the information relating to the interaction, information relating to the sale of the item, and/or other relevant or contextual information) based at least in part on the tracking of the interaction.

In some embodiments, and in accordance with this example interaction, the user 104 can grant the VA 116 certain privileges or otherwise authorize the VA 116 to make a payment (e.g., from an account of the user 104), on behalf of the user 104, to the VA 108 (or the other user associated with the entity 110) to complete the purchase of the item. For example, the user 104 can provide the VA 116 with verbal or textual instructions, commands, or preferences, via a desired interface of the VA 116 (or communication device 102), that can grant the VA 116 certain privileges to make a payment, on behalf of the user 104, to the VA 108 (or the other user associated with the entity 110) to complete the purchase of the item, wherein the payment can be made from one or more accounts of the user 104 to which the VA 116 has been granted access rights.

With further regard to the communication network 106 depicted in FIG. 1, a RAN of the communication network 106 can be associated with (e.g., connected to) or can comprise a core network (e.g., mobile core network) that can facilitate communications by communication devices (e.g., communication device 102, communication device 114, VA 108, VA 116, . . . ) wirelessly connected to the communication network 106. A communication device (e.g., communication device 102, communication device 114, VA 108, VA 116, . . . ) can be communicatively connected to the core network via a base station. The core network can facilitate wireless communication of voice and data associated with communication devices associated with the communication network 106. The core network can facilitate routing voice and data communications between communication devices and/or other communication devices (e.g., phone, computer, VA, email server, multimedia server, audio server, video server, news server, financial or stock information server, other communication devices associated with an IP-based network (e.g., the Internet, an intranet, . . . ) (not shown in FIG. 1) associated with the communication network 106.

In accordance with various embodiments, the communication network 106 can comprise a macro communication network and/or a micro communication network. The macro communication network can be, can comprise, or can be associated with a core network, a cellular network, an IP-based network, Wi-Fi, gigabit wireless (Gi-Fi) network, Hi-Fi network (e.g., providing higher gigabit data communication than Gi-Fi or Wi-Fi), BLUETOOTH™, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Gi-Fi, Hi-Fi, BLUETOOTH™, ZigBee, etc., and/or can be associated with (e.g., connected to) the macro communication network. The micro communication network can be or can comprise, for example a local area network (LAN), that can facilitate connecting certain devices (e.g., communication devices) associated with the micro communication network to each other and/or to the macro communication network.

Respective communication devices (e.g., communication device 102, communication device 114, VA 108, VA 116, . . . ) can be associated with (e.g., communicatively connected to) the communication network 106 via a wireless communication connection or a wireline (e.g., wired) communication connection (e.g., via a cell and associated base station). The respective communication devices can operate and communicate in a communication network environment. At various times, a communication device can be communicatively connected via a wireless communication connection(s) to one or more radio access networks (RANs), which can comprise one or more base stations to communicatively connect the communication device to the communication network 106 to enable the communication device to communicate other communication devices associated with (e.g., communicatively connected to) the communication network 106 in the communication network environment. The one or more RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 106 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 106 (e.g., a core network, cellular network, or a network comprising a core network, cellular network, and/or an IP-based network) can facilitate routing voice and data communications between a communication device(s) (e.g., communication device 102, communication device 114, VA 108, VA 116, . . . ) and another communication device associated with the communication network 106 in the communication network environment. The communication network 106 and/or the core network also can allocate resources to the communication devices in the communication network 106, convert or enforce protocols, establish and enforce quality of service (QoS) for the communication devices, provide applications or services in the communication network 106, translate signals, and/or perform other desired functions to facilitate system interoperability and communication in the communication network 106 (e.g., wireless portion of the communication network 106 or wireline portion of the communication network 106). The communication network 106 and/or the core network further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., communication device 102, communication device 114, VA 108, VA 116, . . . ) is moved through a wireless communication network environment, at various times, the communication device(s) can be connected (e.g., wirelessly connected) to one of a plurality of base stations or APs (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., base station) can serve a specified coverage area to facilitate communication by the communication device(s) or other communication devices in the wireless communication network environment. An AP can serve a respective coverage cell (e.g., macrocell, femtocell, picocell, . . . ) that can cover a respective specified area, and the AP can service mobile wireless devices, such as the communication device(s) located in the respective area covered by the respective cell, where such coverage can be achieved via a wireless link (e.g., uplink (UL), downlink (DL)). When an attachment attempt is successful, the communication device(s) can be served by the AP and incoming voice and data traffic can be paged and routed to the communication device(s) through the AP, and outgoing voice and data traffic from the communication device(s) can be paged and routed through the AP to other communication devices in the communication network environment. In an aspect, the communication device(s) can be connected and can communicate wirelessly using virtually any desired wireless technology, including, for example, cellular, Wi-Fi, Gi-Fi, Hi-Fi, Wi-Max, BLUETOOTH™, wireless local area networks (WLAN), etc.

The disclosed subject matter, by employing the CMC 112, and the VAs (e.g., VA 108, VA 116), can enable desirable managing of interactions, including managing VAs during the interaction and managing the participation of participants (or potential participants) in the interaction, wherein the CMC 112 can take into consideration advanced VA states, including context associated with the interaction, in managing the interactions, as more fully described herein. The disclosed subject matter (e.g., employing the CMC 112) can allow tracking and understanding of user states, VA states, privileges of VAs (e.g., as granted by users), and context associated with an interaction, and making determinations and managing VAs and other participants associated with an interaction based at least in part on the tracking and understanding of user states, VA states, VA privileges, and context.

The disclosed subject matter, by employing the CMC 112, and the VAs (e.g., VA 108, VA 116), can provide enhanced inter- and intra-VA communications functionality, wherein the disclosed subject matter can determine protocols for handoff between participants (e.g., handoff from user to VA; handoff from VA to user; or handoff from VA to another VA) associated with an interaction such that conversational flow between participants in the interaction can be enhanced (e.g., optimized or improved) and transparent for each participant (e.g., user can know when the user is interacting with a VA; or a VA can know when the VA is interacting with a user or with another VA), as more fully described herein.

The disclosed subject matter, by employing the CMC 112, and the VAs (e.g., VA 108, VA 116), also can provide workflow catch-up functionality that can enable a user (e.g., user 104, or user 302) or VA to be provided interaction update information to bring the user or VA up to date regarding the status or progress of an interaction, for example, when the user or VA enters the interaction or otherwise desires an update regarding the interaction, as more fully described herein. This can enable for enhanced handoff from one participant (e.g., VA) to another participant (e.g., user) during an interaction, desirably efficient entry and exit of participants during an interaction, including desirably efficient entry and exit of human conversation for agents in multi-VA guidances and for the assumption of control by human users in a conversation during an interaction at desired times (e.g., when required by a VA (e.g., proximal VA that is proximate to or associated with the user) or CMC, or when desired by the user).

The disclosed subject matter, by employing the CMC 112, and the VAs (e.g., VA 108, VA 116), can provide for enhanced (e.g., faster) conversations between participants (e.g., users, VAs) and enhanced (e.g., improved or optimal) interactions with a VA (e.g., by a user or another VA) that can be driven, in part, by the other participant to the conversation or interaction, as more fully described herein. The disclosed subject matter, by employing the CMC 112, and the VAs (e.g., VA 108, VA 116), can manage multiple conversations of an interaction that are happening concurrently (e.g., VA-to-user conversation, VA-to-VA conversation, and/or user-to-user conversation), wherein the multiple conversations can be intelligently and contextually organized (e.g., by the CMC 112) across a service organization, as more fully described herein.

The disclosed subject matter, by employing the CMC 112, and the VAs (e.g., VA 108, VA 116), can provide enhanced methods and techniques for human-to-human communication, VA-to-VA communication, and VA-to-human communication through structured context observance and handoff between participants to an interaction, as more fully described herein. The disclosed subject matter also can provide a streamlined, audited, and implicit consent mechanism that can facilitate enhanced mixed human and VA interaction workflows. The disclosed subject matter can determine and employ context of an interaction to provide for enhanced and natural modulations in conversation between participants (e.g., user, VA) that can observe contextual hints on both sides (e.g., user-side, VA-side) of the conversation, and can be customized for natural workflow departure (e.g., questions asked during a conversation) or alternate routes (e.g., following interactive voice response (IVR) mechanisms) for VA interactions.

Figure 4:
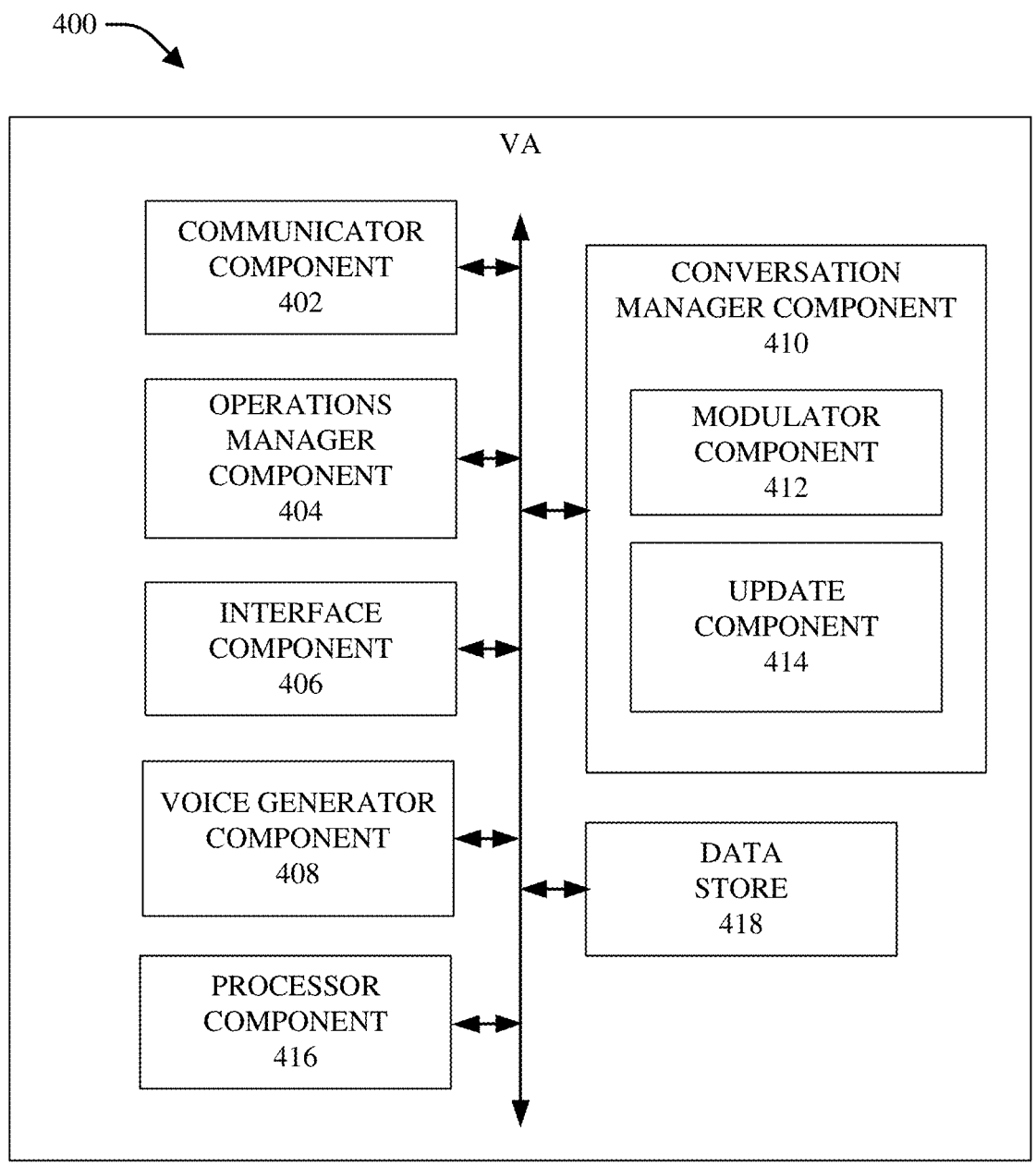
FIG. 4 depicts a block diagram of an example VA 400, in accordance with various aspects and embodiments of the disclosed subject matter.

FIG. 4 depicts a block diagram of an example VA 400, in accordance with various aspects and embodiments of the disclosed subject matter. The VA 400 can comprise, for example, a communicator component 402, an operations manager component 404, an interface component 406, a voice generator component 408, a conversation manager component 410, a modulator component 412, and an update component 414.

The communicator component 402 can transmit information from the VA 400 to another component(s) or device(s) (e.g., another VA, a communication device, a network component or device, . . . ) and/or can receive information from the other component(s) or device(s). For instance, the communicator component 402 can receive (e.g., from another VA or a communication devices of a user) information relating to an event, and/or other interaction-related information, in connection with an interaction between the VA and the other component or device, identifier or authentication information (e.g., device ID, biometric information, communication network address, . . . ) associated with, and/or identifying or facilitating authenticating, an entity, component, or device, and/or other desired information. The communicator component 402 also can transmit, for example, information relating to an event, and/or other interaction-related information, in connection with an interaction between the VA and the other component or device, identifier or authentication information associated with, and/or identifying or facilitating authenticating, the VA 400 or an entity associated with the VA 400, and/or other desired information.

The operations manager component 404 that can control (e.g., manage) operations associated with the VA 400. For example, the operations manager component 404 can facilitate generating instructions to have components of the VA 400 perform operations, and can communicate respective instructions to respective components (e.g., communicator component 402, interface component 406, voice generator component 408, conversation manager component 410, modulator component 412, update component 414, . . . ) of the VA 400 to facilitate performance of operations by the respective components of the VA 400 based at least in part on the instructions, in accordance with the defined communication management criteria and a communication management algorithm(s) (e.g., communication management algorithms as disclosed, defined, recited, or indicated herein by the methods, systems, and techniques described herein). The operations manager component 404 also can facilitate controlling data flow between the respective components of the VA 400 and controlling data flow between the VA 400 and another component(s) or device(s) (e.g., another VA, a communication device, a base station or other network node component or device of the communication network) associated with (e.g., connected to) the VA 400.

The interface component 406 can comprise one or more interfaces, such as, for example, a display screen (e.g., touch display screen), an audio interface (e.g., microphone(s), speaker(s)), keyboard, keypad, controls, buttons, etc., that can be used to present information to a user associated with the VA 400 or receive information from the user, such as information that is input to the VA 400 by the user and is related to an event or is otherwise related to the interaction. The VA 400 can interact with and have a conversation with the user by using the speaker(s) of the interface component 406 to present verbal words to the user, and the VA 400 can receive, via a microphone(s) of the interface component 406, verbal words spoken by the user. As another example, the user can view information (e.g., information relating to the interaction or event) displayed on the display screen of the interface component 406.

The voice generator component 408 can generate one or more voices of the VA 400 for use in communicating (e.g., speaking) verbal words and sounds that can be emitted from the VA 400 via the interface component 406 and/or communicator component 402. A voice generated by the voice generator component 408 can be a virtual or emulated voice that can emulate, mimic, recreate, or sound similar to the actual voice of a human being. The voice can have various characteristics (e.g., word speed, speech cadence, inflection, tone, language, dialect, vocabulary level, . . . ) that can define or structure the voice and the speaking (e.g., virtual or emulated speaking) of verbal words by the voice generator component 408.

The conversation manager component 410 can manage (e.g., control, modify, or adjust) the voice (e.g., the characteristics of the virtual or emulated voice) and the emission (e.g., speaking) of verbal words by the voice generator component 408 to facilitate managing a conversation with a user or another VA based at least in part on the context of the interaction with the user or other VA, including the verbal words spoken, and the characteristics of the verbal words spoken, by the user or other VA during the conversation. The conversation manager component 410 also can determine and manage the verbal words to be emitted by the voice generator component 408 during the conversation, based at least in part on the context of the interaction, including what was said to the VA 400 by the user or other VA participating in the conversation. For example, based at least in part on the context, the conversation manager component 410 (e.g., in coordination with, or as managed by, the CMC) can determine a question to ask or a statement to make to the user or other VA next in a conversation, a response to a question or statement made by the user or other VA to the VA 400, etc. The conversation manager component 410 can coordinate with, be managed by, and/or operate in conjunction with the CMC to facilitate managing the voice, the determination of verbal words to be emitted, the emission of verbal words, and the overall conversing by the voice generator component 408, based at least in part on the context, in accordance with the defined communication management criteria.

The conversation manager component 410 can comprise a modulator component 412 that can be utilized to modulate or adjust the voice, including adjusting the characteristics of the voice, produced by the voice generator component 408. For example, based at least in part on the context of the interaction, the modulator component 412 can adjust (e.g., increase or decrease) the speed and/or cadence of the verbal words emitted by the voice generator component 408, the inflection and/or tone of the voice and/or verbal words emitted by the voice generator component 408, the language and/or dialect of the verbal words emitted by the voice generator component 408, the vocabulary level of the verbal words emitted by the voice generator component 408, the syntax of the conversation, and/or one or more other characteristics of the voice or verbal words to facilitate producing verbal words that can enhance the flow of the conversation and enhance the productivity and results of the conversation and interaction.

The update component 414 can be employed to provide a catch-up service to enable a user (or VA) to be caught up or updated regarding the status or progress of an interaction when the user (or VA) is entering or re-entering a conversation associated with the interaction or when an update regarding the status or progress of the interaction is otherwise desired by the user. In some embodiments, the update component 414 can coordinate with and/or can be managed by the CMC to facilitate determining whether an update is to be provided to a user (or VA) and/or the content of the update to be provided to the user (or VA). The update component 414 can determine and/or generate, or facilitate determining and/or generating, an update, comprising interaction update information relating to the interaction, based at least in part on the current context of the interaction, including the current status or progress of the interaction. The interaction update information can comprise a summary or a subset of interaction-related information and/or event-related information, for example. The VA 400 can present the update (e.g., interaction update information) to the user (or VA, such as another VA) via the interface component 406 or the communicator component 402.

The VA 400 also can include a processor component 416 that can work in conjunction with the other components (e.g., communicator component 402, interface component 406, voice generator component 408, conversation manager component 410, modulator component 412, update component 414, and data store 418) to facilitate performing the various functions of the VA 400. The processor component 416 can employ one or more processors, microprocessors, or controllers that can process data, such as information relating to interactions, events, contexts of interactions, status or progress of interactions, activities relating to interactions, conversations associated with the VA 400, identifiers or authentication credentials associated with entities, devices, or components, voice generation of the VA 400, characteristics or modulations of the one or more voices generated by the VA 400, catch-up service, parameters, traffic flows, policies, defined communication management criteria, algorithms (e.g., communication management algorithm(s)), protocols, interfaces, tools, and/or other information, to facilitate operation of the VA 400, as more fully disclosed herein, and control data flow between the VA 400 and other components (e.g., other VAs, communication devices, base stations, network devices of the communication network, data sources, applications, . . . ) associated with the VA 400.

The data store 418 that can store data structures (e.g., user data, metadata), code structure(s) (e.g., modules, objects, hashes, classes, procedures) or instructions, information relating to interactions, events, contexts of interactions, status or progress of interactions, activities relating to interactions, conversations associated with the VA 400, identifiers or authentication credentials associated with entities, devices, or components, voice generation of the VA 400, characteristics or modulations of the one or more voices generated by the VA 400, catch-up service, parameters, traffic flows, policies, defined communication management criteria, algorithms (e.g., communication management algorithm(s)), protocols, interfaces, tools, and/or other information, to facilitate controlling operations associated with the VA 400. In an aspect, the processor component 416 can be functionally coupled (e.g., through a memory bus) to the data store 418 in order to store and retrieve information desired to operate and/or confer functionality, at least in part, to the communicator component 402, interface component 406, voice generator component 408, conversation manager component 410, modulator component 412, update component 414, and data store 418, etc., and/or substantially any other operational aspects of the VA 400.

Figure 5:
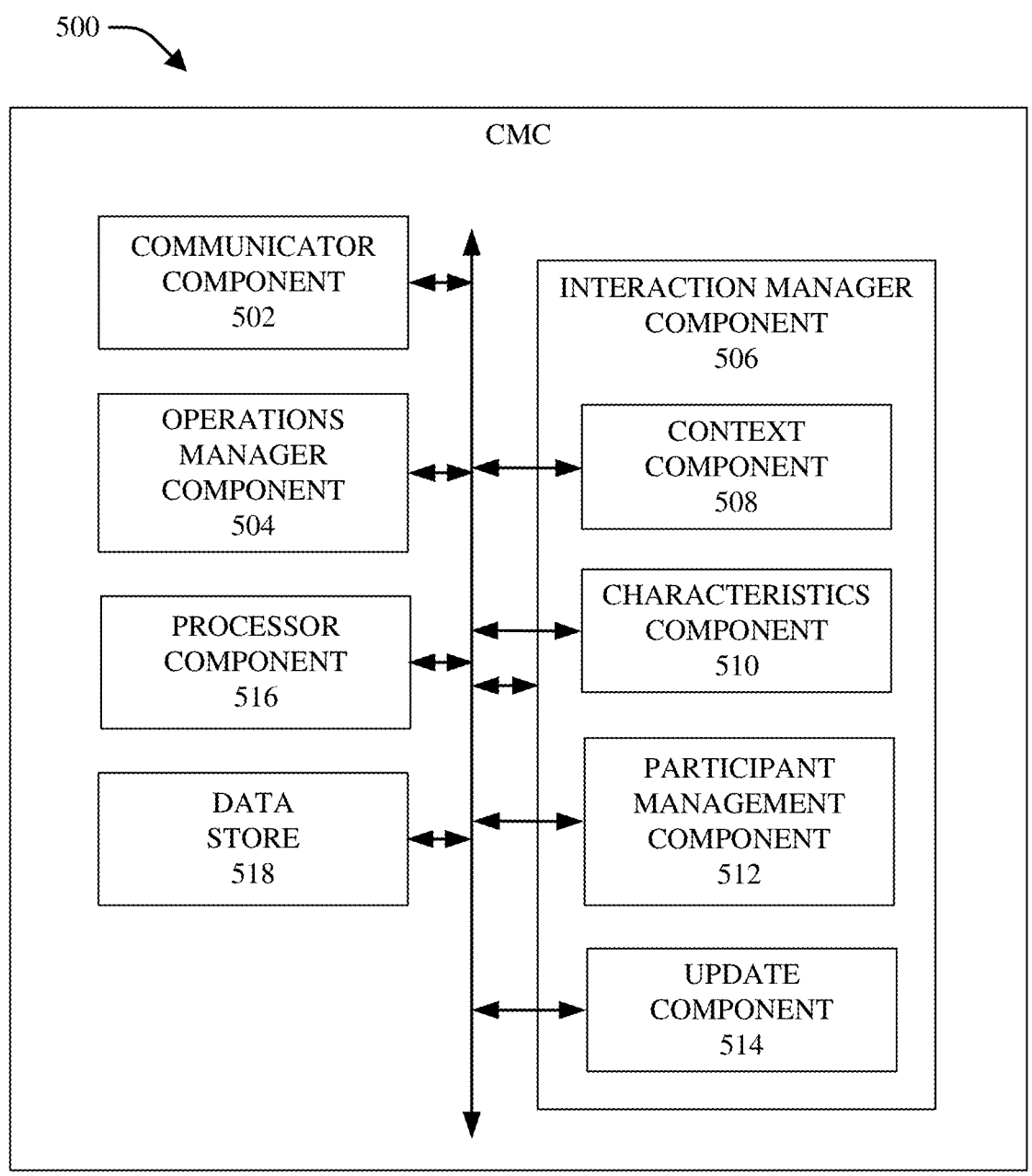
FIG. 5 illustrates a block diagram of an example communication management component, in accordance with various aspects and embodiments of the disclosed subject matter.

FIG. 5 illustrates a block diagram of an example communication management component (CMC) 500, in accordance with various aspects and embodiments of the disclosed subject matter. The CMC 500 can comprise, for example, a communicator component 502, an operations manager component 504, and an interaction manager component 506, wherein the interaction manager component 506 can comprise a context component 508, a characteristics component 510, a participant management component 512, and an update component 514. The CMC 500 can be the same as or similar to that, and/or can comprise the same or similar functionality, as more fully described herein. The CMC 500 also can include a processor component 516, and a data store 518.

The communicator component 502 can transmit information from the CMC 500 to another component(s) or device(s) (e.g., a VA, a communication device, a network component or device, . . . ) and/or can receive information from the other component(s) or device(s). For instance, the communicator component 502 can receive (e.g., from a VA, or a communication device associated with a user) information relating to an interaction (e.g., interaction-related information, event-related information), identifier or authentication information (e.g., device ID, user ID, authentication credentials, biometric information, and/or communication network address, . . . ) associated with an entity, component, or device, and/or other desired information. The communicator component 502 also can, for example, transmit, to a VA or user (e.g., communication device of a user), information relating to the interaction, modification information (e.g., to modify the characteristics of the voice or verbal words presented by a VA; to modify the conversation by modifying the statements made by the VA), participant-related information to change participants actively engaging in the interaction, update information relating to the interaction, and/or other information.

The operations manager component 504 that can control (e.g., manage) operations associated with the CMC 500. For example, the operations manager component 504 can facilitate generating instructions to have components of the CMC 500 perform operations, and can communicate respective instructions to respective components (e.g., communicator component 502, operations manager component 504, interaction manager component 506, . . . ) of the CMC 500 to facilitate performance of operations by the respective components of the CMC 500 based at least in part on the instructions, in accordance with the defined communication management criteria and a communication management algorithm(s) (e.g., communication management algorithms as disclosed, defined, recited, or indicated herein by the methods, systems, and techniques described herein). The operations manager component 504 also can facilitate controlling data flow between the respective components of the CMC 500 and controlling data flow between the CMC 500 and another component(s) or device(s) (e.g., a VA, a communication device, a base station or other network node component or device of the communication network) associated with (e.g., connected to) the CMC 500.

The interaction manager component 506 can manage interactions, including managing participants in interactions (e.g., what users or devices participate in an interaction at a particular time), conversations between participants in interactions, verbal words presented by a VA during an interaction, updates regarding interactions to users or VAs entering an interaction or otherwise desired by users or VAs, and/or other aspects relating to interactions, based at least in part on context associated interactions (e.g., the context of an interaction at a given time), in accordance with the defined communication management criteria. In some embodiments, based at least in part on the context determined for an interaction, the interaction manager component 506 can determine the words to be presented by a VA (e.g., how the VA is to respond to a user) during the interaction, the characteristics of the voice or the verbal words presented by the VA during the interaction, in accordance with the context of an interaction.

The interaction manager component 506 can employ the context component 508 to determine the context of an interaction at a given time. The context component 508 can determine the context based at least in part on current or recent information regarding the interaction, historical information that can be relevant to the interaction, and/or other information that can be relevant to the interaction. The historical information can relate to the type of interaction (e.g., type of event associated with the interaction, an item (e.g., item for sale) associated with the interaction, the participants (e.g., particular user(s), VA or type of VA, . . . ) in the interaction), a relationship (e.g., a previous relationship or interaction(s) between participants in the interaction, the location of the interaction or part of the interaction, etc.

The interaction manager component 506 can utilize the characteristics component 510 to determine the characteristics of the voice and verbal words being presented by a VA at a given time and/or modifications that can be made to the characteristics of the voice and verbal words being presented by a VA at a given time, based at least in part on the context determined for the interaction, to facilitate enhancing the presentation of verbal words by the VA, the conversation between the VA and another participant (e.g., a user, another VA), and the productivity and results of the interaction. For example, during an interaction, based at least in part on the context determined for the interaction, the characteristics component 510 can determine that a speed and/or cadence of the presentation of words by a VA is to be modified (e.g., speed is to be decreased and/or cadence is to be adjusted) to facilitate enhancing the conversation between the VA and a user, wherein the context can indicate that the user is having some difficulty in understanding the verbal words being presented by the VA to the user.

The participant management component 512 can manage the respective participation of respective participants in an interaction, based at least in part on the context of the interaction (e.g., context at a given time during the interaction). For example, at a given time during an interaction, a VA associated with a user and another VA associated with an entity can be exchanging information relating to an event between each other. The context of the interaction, at the given time, can indicate that additional information and/or consent is desired from the user. Based at least in part on the context, the participant management component 512 can determine that the user is to enter (or re-enter) the interaction to actively participate in the interaction to provide the additional information and/or consent to the VA or other VA. The interaction manager component 506, employing the communicator component 502, can communicate request information to the VA, the other VA, or a communication device of the user, wherein the request information can request that the user enter (or re-enter) the interaction to provide the additional information and/or consent to the VA or other VA.

As another example, the context of an interaction, at a given time, can indicate that it is acceptable or desirable for a VA to communicate with the other VA via a data communication channel, wherein the user can become an inactive or passive member of the interaction. Based at least in part on the context, the participant management component 512 can determine that the VA is to communicate with the other VA (e.g., using non-verbal data communication) via the data communication channel, and the user can become an inactive or passive member of the interaction. The interaction manager component 506, employing the communicator component 502, can communicate information to the VA, the other VA, and/or a communication device of the user that can indicate or instruct the VA, the other VA, and/or the user to have the VA and the other VA communicate data between each other (e.g., using non-verbal data communication) via the data communication channel, and to have the user transition to an inactive or passive member of the interaction (unless the user expresses a desire to continue being an active participant in the interaction).

The update component 514 can be employed to provide a catch-up service to enable a user (or VA) to be caught up or updated regarding the status or progress of an interaction when the user (or VA) is entering or re-entering a conversation associated with the interaction or when an update regarding the status or progress of the interaction is otherwise desired by the user. In some embodiments, the update component 514 can coordinate with a VA to facilitate determining whether an update is to be provided to a user (or VA) and/or the content of the update to be provided to the user (or VA). The update component 514 can determine and/or generate, or facilitate determining and/or generating, an update, comprising interaction update information relating to the interaction, based at least in part on the current context of the interaction, including the current status or progress of the interaction. The interaction update information can comprise, for example, a summary or a subset of interaction-related information and/or event-related information. The interaction manager component 506, employing the communicator component 502, can present the update (e.g., interaction update information) to the user (or VA) via the communicator component 502.

The processor component 516 that can work in conjunction with the other components (e.g., communicator component 502, operations manager component 504, interaction manager component 506, . . . , and data store 518) to facilitate performing the various functions of the CMC 500. The processor component 516 can employ one or more processors, microprocessors, or controllers that can process data, such as information relating to interactions, events, contexts of interactions, status or progress of interactions, activities relating to interactions, conversations associated with participants of interactions, identifiers or authentication credentials associated with entities, devices, or components, voice generation of a VA, characteristics or modulations of one or more voices generated by a VA, catch-up (e.g., update) service, parameters, traffic flows, policies, defined communication management criteria, algorithms (e.g., communication management algorithm(s)), protocols, interfaces, tools, and/or other information, to facilitate operation of the CMC 500, as more fully disclosed herein, and control data flow between the CMC 500 and other components (e.g., VAs, communication devices, base stations, network devices of the communication network, data sources, applications, . . . ) associated with the CMC 500.

The data store 518 that can store data structures (e.g., user data, metadata), code structure(s) (e.g., modules, objects, hashes, classes, procedures) or instructions, information relating to interactions, events, contexts of interactions, status or progress of interactions, activities relating to interactions, conversations associated with participants of interactions, identifiers or authentication credentials associated with entities, devices, or components, voice generation of a VA, characteristics or modulations of one or more voices generated by a VA, catch-up (e.g., update) service, parameters, traffic flows, policies, defined communication management criteria, algorithms (e.g., communication management algorithm(s)), protocols, interfaces, tools, and/or other information, to facilitate controlling operations associated with the CMC 500. In an aspect, the processor component 516 can be functionally coupled (e.g., through a memory bus) to the data store 518 in order to store and retrieve information desired to operate and/or confer functionality, at least in part, to the communicator component 502, operations manager component 504, interaction manager component 506, and data store 518, etc., and/or substantially any other operational aspects of the CMC 500.

Figure 6:
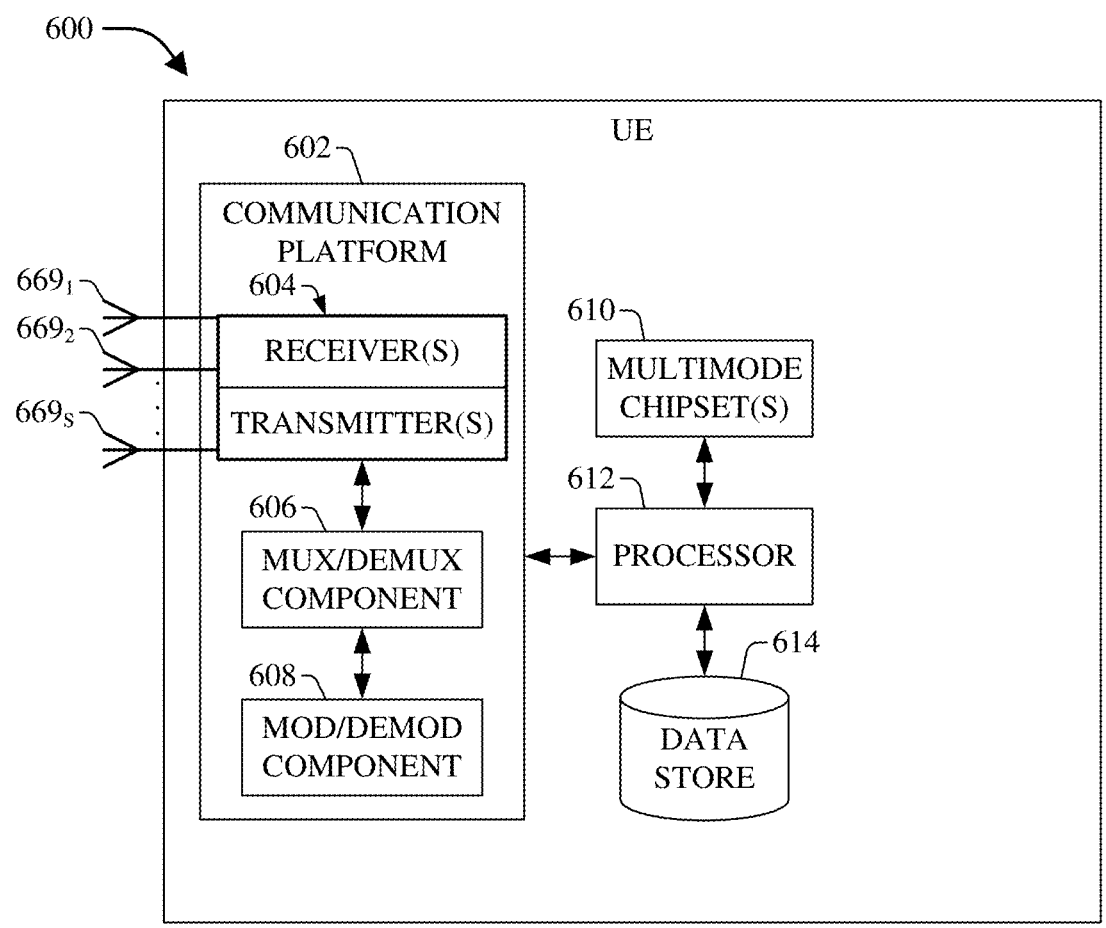
FIG. 6 depicts a block diagram of example user equipment, in accordance with various aspects and embodiments of the disclosed subject matter.

FIG. 6 depicts a block diagram of an example UE 600 (e.g., communication device) in accordance with various aspects and embodiments of the disclosed subject matter. In accordance with various embodiments, the UE 600 (e.g., communication device) can be a multimode access terminal, wherein a set of antennas $669_1$-$669_S$ (S can be a positive integer) can receive and transmit signal(s) from and to wireless devices like access points, access terminals, wireless ports and routers, and so forth, that operate in a radio access network. It should be appreciated that antennas $669_1$-$669_S$ can be a part of communication platform 602, which comprises electronic components and associated circuitry that provide for processing and manipulation of received signal(s) and signal(s) to be transmitted; e.g., receivers and transmitters 604, multiplexer/demultiplexer (mux/demux) component 606, and modulation/demodulation (mod/demod) component 608.

In some implementations, the UE 600 can include a multimode operation chipset(s) 610 that can allow the UE 600 to operate in multiple communication modes in accordance with disparate technical specification for wireless technologies. In an aspect, multimode operation chipset(s) 610 can utilize communication platform 602 in accordance with a specific mode of operation (e.g., voice, global positioning system (GPS), . . . ). In another aspect, multimode operation chipset(s) 610 can be scheduled to operate concurrently (e.g., when S>1) in various modes or within a multitask paradigm.

The UE 600 also can include a processor(s) 612 that can be configured to confer functionality, at least in part, to substantially any electronic component within the UE 600, in accordance with aspects of the disclosed subject matter. For example, the processor(s) 612 can facilitate enabling the UE 600 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 612 can facilitate enabling the UE 600 to process data relating to messaging, voice calls, or other services (e.g., Internet services or access); information relating to measurements of signal conditions with respect to cells; information relating to cells to facilitate connection to a source cell or target cell; information relating to parameters (e.g., UE parameters, network-related parameters); information relating to interactions between the UE 600 and other devices or components (e.g., VA, another communication device), as more fully described herein; and/or other data.

The UE 600 also can contain a data store 614 that can store data structures (e.g., user data, metadata); code structure(s) (e.g., modules, objects, classes, procedures) or instructions; message hashes; neighbor cell list; one or more lists (e.g., whitelist, etc.); information relating to measurements of signal conditions with respect to cells; information relating to cells to facilitate connection to a source cell or target cell; information relating to parameters (e.g., UE parameters, network-related parameters); information relating to interactions between the UE 600 and other devices or components (e.g., VA, another communication device); UE identifier; information relating to voice calls, messaging, or other services associated with the UE 600; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 612 can be functionally coupled (e.g., through a memory bus) to the data store 614 in order to store and retrieve information (e.g., neighbor cell list; signal quality measurement-related information; cell-related information; parameter information; information relating to messaging, voice calls, or other services (e.g., interactive services); information relating to interactions; frequency offsets; desired algorithms; security code; UE identifier; . . . ) desired to operate and/or confer functionality, at least in part, to communication platform 602, multimode operation chipset(s) 610, and/or substantially any other operational aspects of the UE 600.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
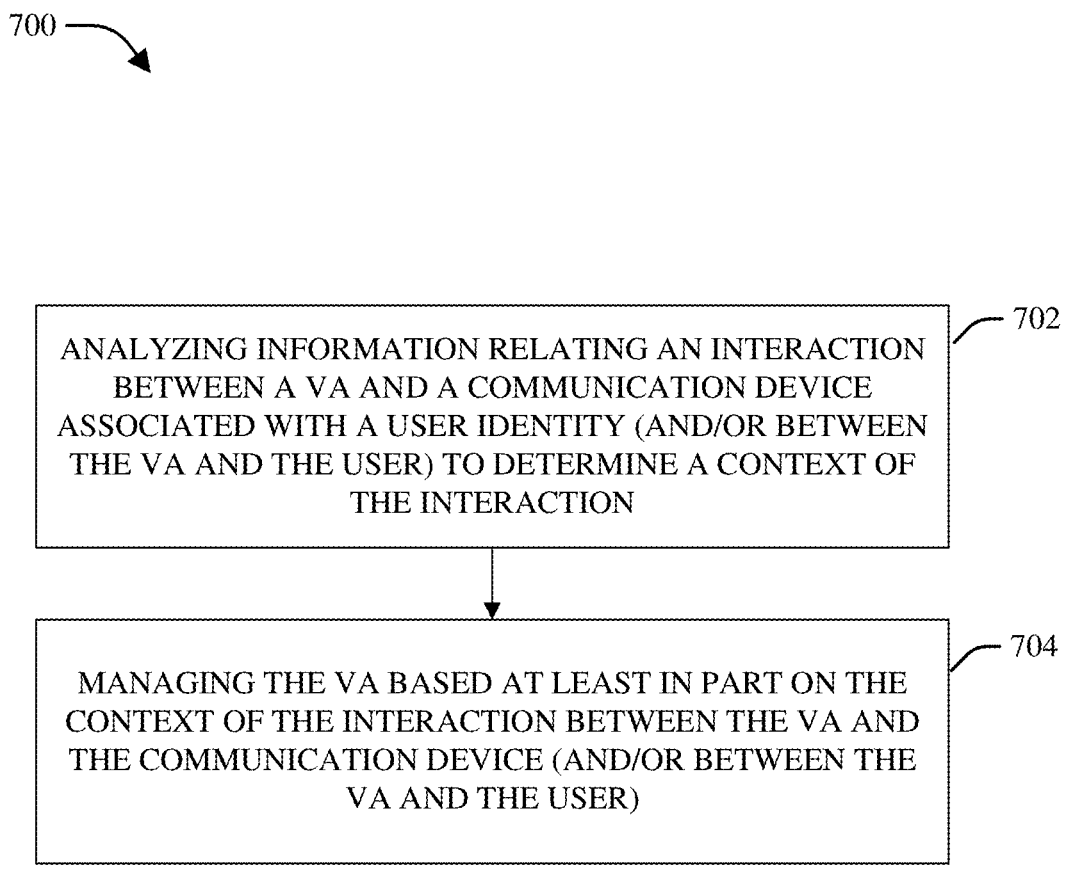
FIG. 7 illustrates a flow chart of an example method that can manage a VA in interactions with a user, another VA, or another entity, in accordance with various aspects and embodiments of the disclosed subject matter.
Figure 8:
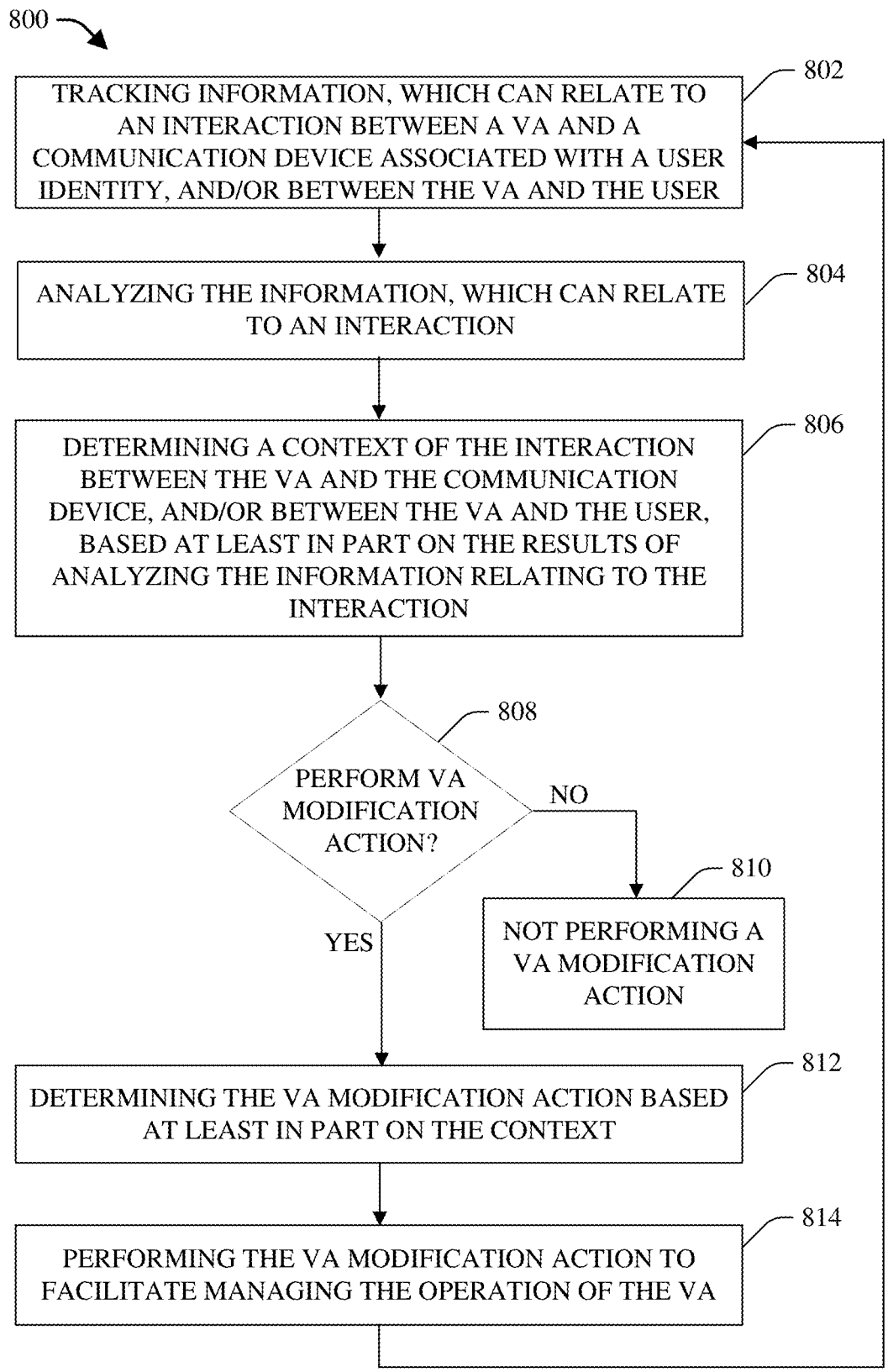
FIG. 8 presents a flow chart of an example method that can manage VAs in interactions with users, other VAs, or other entities, in accordance with various aspects and embodiments of the disclosed subject matter.
Figure 9:
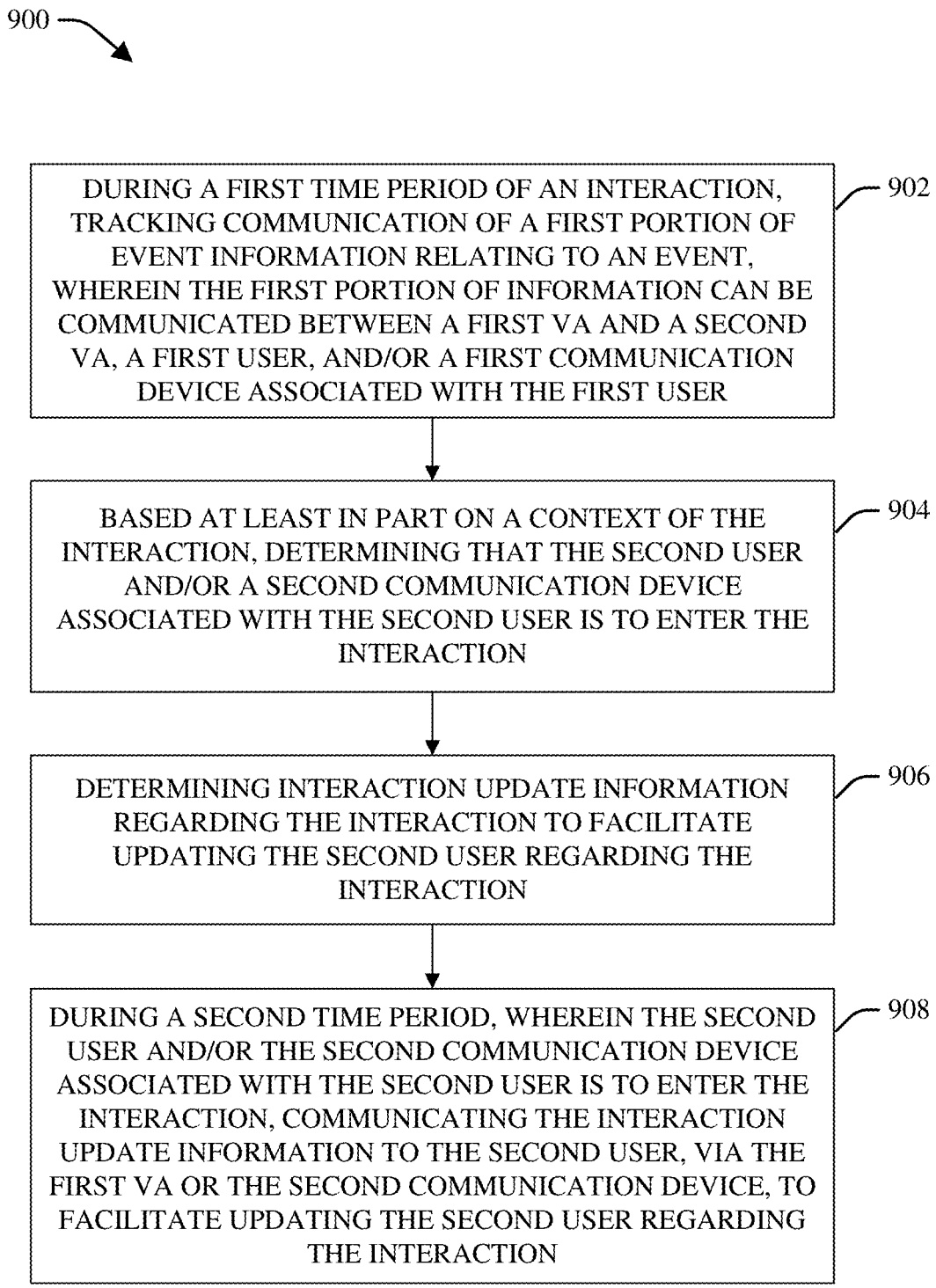
FIG. 9 depicts a flow chart of an example method that can facilitate bringing a user up to date regarding an interaction when the user enters the interaction, in accordance with various aspects and embodiments of the disclosed subject matter.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can manage a VA in interactions with a user, another VA, or another entity, in accordance with various aspects and embodiments of the disclosed subject matter. The method 700 can be employed by, for example, a system comprising the CMC, which can a processor component (e.g., of or associated with the CMC), and/or a data store (e.g., of or associated with the CMC).

At 702, information relating an interaction between a VA and a communication device associated with a user identity (associated with a user) (and/or between the VA and the user) can be analyzed to determine a context of the interaction. The CMC can track and/or receive information relating to the interaction between the VA (e.g., VA device) and the communication device. The interaction can be, for example, a conversation between the VA and a user (e.g., user having or associated with the user identity) who can be using the communication device to communicate with the VA. In some embodiments, the user can be communicating directly with the VA without using a communication device. The information relating to the interaction can comprise, for example, data (e.g., event data relating to an event, sensor data relating to the event and obtained from sensors, . . . ) being exchanged between the VA and the user, via the communication device, a speed of the respective conversing (e.g., communication of verbal or audible words) of the VA and the user, respective voice tones, inflections, or cadences of the VA and the user, other respective characteristics of the VA and user with respect to the interaction, the progress or status of the conservation between the VA and user (e.g., progress or status of filing an insurance claim, progress or status of a purchase of a product or service, or progress or status relating to another type of event). Based at least in part on the results of analyzing the information relating to the interaction, the CMC can determine a context of the interaction.

At 704, the VA can be managed based at least in part on the context of the interaction between the VA and the communication device associated with the user identity (and/or between the VA and the user). The CMC can manage the VA (e.g., control operation of the VA) with respect to the interaction between the VA and the communication device associated with the user identity (associated with the user), or between the VA and the user, based at least in part on the context determined for the interaction, to facilitate enhancing the interaction, including the user experience, between the VA and the communication device (and associated user). For instance, based at least in part on the context, the CMC can manage (e.g., control, modify, or adjust) a speed of presentation of audible or verbal words by the VA to the communication device associated with the user identity. In accordance with various embodiments, the CMC also can manage a tone of voice (e.g., virtual or emulated voice) of the VA, an inflection of the voice of the VA, a cadence of the audible words being presented by the VA, and/or other characteristics of the voice of the VA, based at least in part on the context, as more fully described herein.

In some embodiments, the CMC can manage the VA to suspend the interaction of the VA with the communication device of the user, for example, to hand off the communication device and associated user to another communication device of another user (e.g., user associated with a business entity), another VA (e.g., a VA that has particular characteristics, serves a particular domain, or is associated with the user or another entity (e.g., another business entity)), or other type of entity (e.g., software-based entity, component, or device), as more fully described herein.

FIG. 8 presents a flow chart of an example method 800 that can manage VAs in interactions with users (e.g., communication devices and associated users), other VAs, or other entities (e.g., software-based entities, components, or devices), in accordance with various aspects and embodiments of the disclosed subject matter. The method 800 can be employed by, for example, a system comprising a system comprising the CMC, which can a processor component (e.g., of or associated with the CMC), and/or a data store (e.g., of or associated with the CMC).

At 802, information, which can relate to an interaction between a VA and a communication device associated with a user identity (e.g., associated with a user) and/or between the VA and the user, can be tracked. The CMC can monitor and track the interaction between the VA and the communication device (and/or associated user, whether or not the user is using the communication device to interact with the VA). The CMC can receive and/or generate information relating to the interaction based at least in part on the monitoring and tracking of the interaction, and/or can monitor and track the information relating to the interaction.

At 804, the information, which can relate to the interaction, can be analyzed. The CMC can analyze the information to facilitate determining a context of the interaction between the VA and the communication device (and/or associated user) and management of the interaction.

At 806, a context of the interaction between the VA and the communication device, and/or between the VA and the user, can be determined, based at least in part on the results of analyzing the information relating to the interaction. The CMC can determine the context relating to the interaction between the VA and the communication device, and/or between the VA and the user, based at least in part on the results of analyzing the information relating to the interaction.

At 808, a determination can be made regarding whether a VA modification action is to be performed, based at least in part on the context, to facilitate managing the operation of the VA. The CMC can determine whether a VA modification is to be performed, and, if so, which type of VA modification is to be performed, based at least in part on the context, to facilitate managing the operation of the VA, and managing the interaction between the VA and the communication device (and associated user).

At 810, in response to determining that no VA modification action is to be performed, the method 800 can return to reference numeral 802, with no VA modification action being performed, wherein the method 800 can proceed to track information relating to the interaction between the VA and the communication device associated with the user identity and perform one or more operations of method 800, as described herein. In response to determining that no VA modification action is to be performed, based at least in part on the determined context, the CMC can determine that no VA modification action is to be performed at the time, and the CMC can continue to monitor and track information relating to the interaction between the VA and the communication device associated with the user identity, and can perform one or more operations of method 800, such as described herein.

If, at reference numeral 808, it is determined that a VA modification action is to be performed, based at least in part on the context, at 812, the VA modification action can be determined based at least in part on the context. At 814, the VA modification action can be performed to facilitate managing the operation of the VA. In response to determining that a VA modification action is to be performed, based at least in part on the determined context, the CMC can determine the VA modification action that is to be performed, and can perform the VA modification action, to facilitate managing the operation of the VA. The VA modification action can comprise, for example, modifying one or more characteristics of the VA (e.g., speed of words being presented by the VA, cadence of words being presented by the VA, tone or inflection of voice of the VA, . . . ), suspending active communication with the communication device of the user, and/or modifying operation of the VA to have the VA communicate (e.g., via non-verbal or verbal communication of information) with another VA, as more fully described herein.

At this point, the method 800 can proceed from reference numeral 814 to reference numeral 802, wherein the method 800 can proceed to track information relating to the interaction between the VA and the communication device associated with the user identity and perform one or more operations of method 800, as described herein. For instance, in accordance with the method 800, as the interaction continues to proceed, the CMC can determine (e.g., at reference numeral 806) that the context is different than it was before, and, based at least in part on the new context, can determine that a VA modification action is to be performed (e.g., at reference numeral 808) to modify the operation of the VA, can determine the VA modification action to be performed (e.g., at reference numeral 812), and can perform the VA modification action (e.g., at reference numeral 814).

FIG. 9 depicts a flow chart of an example method 900 that can facilitate bringing a user up to date regarding an interaction when the user enters the interaction, in accordance with various aspects and embodiments of the disclosed subject matter. The method 900 can be employed by, for example, a system comprising the CMC, which can a processor component (e.g., of or associated with the CMC), and/or a data store (e.g., of or associated with the CMC).

At 902, during a first time period of an interaction, communication of a first portion of event information relating to an event can be tracked, wherein the first portion of information can be communicated between a first VA and a second VA, a first user, and/or a first communication device associated with the first user. During the first time period of the interaction, the CMC can track the communication of the first portion of the event information between the first VA and the second VA, the first user, and/or the first communication device (e.g., the first user using the first communication device). The second VA can be associated with an entity (e.g., an insurance company, a business or seller entity, medical personnel, law enforcement, . . . ) and/or the first user. The first VA can be associated with a second user and/or another entity (e.g., a service entity that can provide a service, employing the first VA, to the second user in connection with a vehicle, such as a vehicle of or used by the second user), wherein the second user is not actively participating in the interaction during the first time period. The event can relate to, for example, a vehicle accident, a potential purchase of a product or service, a medical situation (e.g., injury or medical emergency) involving the second user or someone associated with the second user, or a legal situation (e.g., a crime that is being reported or investigated).

At 904, based at least in part on a context of the interaction, a determination can be made that the second user and/or a second communication device associated with the second user is to enter the interaction. The CMC can determine the context of the interaction, based at least in part on interaction information regarding the interaction and/or the first portion of the event information. Based at least in part the context, the CMC can determine that the second user and/or the second communication device associated with the second user is to enter the interaction.

For example, if the event relates to a vehicle accident involving the second user, during the first time period, the first VA can be acting on behalf of the second user to communicate event information to the second VA, the first user, and/or the first communication device of the first user, and receive event information from the second VA, the first user, and/or the first communication device, while the second user can be not participating, or at least not actively (e.g., passively or inattentively) participating, in the interaction. The communication of the first portion of the event information can be non-verbal data (e.g., data communications between the first VA and the second VA) or event information in the form of verbal words (e.g., first VA conversing with the first user (or second VA)). The first portion of the event information, for example, can relate to the vehicle accident, and/or can relate to reporting the accident, including details of the accident and/or filing of an insurance claim with an insurance company with regard to the accident.

At some point during the interaction (e.g., at or near the end of the first time period), the context can indicate that the second user (e.g., vehicle owner, vehicle driver, or vehicle passenger) is to enter the interaction to communicate with the second VA and/or first user. For instance, the context (e.g., as determined by the CMC) can indicate that the second user is to enter the interaction to communicate with the second VA and/or first user to, for example, obtain the consent of the second user with regard to a condition, legal issue, or other aspect relating to the insurance claim; to obtain additional event information from the second user that can more easily be obtained through human-to-human interaction, rather than human-to-VA interaction, or direct communication with the second user, rather than through interaction with the first VA; or due to a problem with the interaction between the first VA and the first user (and/or the first communication device).

At 906, interaction update information regarding the interaction can be determined to facilitate updating the second user regarding the interaction. The CMC can determine the interaction update information based at least in part on the context, the first portion of the event information, user-related information relating to the second user, and/or other information. The interaction update information can comprise, for example, information regarding the first user (e.g., identification information that identifies the first user, contact information, such as a phone number of the first communication device, business address of the first user (e.g., business address of the insurance company), email address of the first user, . . . ), information regarding the second VA (e.g., identification information that can identify the second VA and/or associations or affiliations of the second VA (e.g., second VA is associated with the first user and the insurance company), a location of the second VA (e.g., location or address where the second VA is instantiated), . . . ), a summary or subset of the event information (e.g., pertinent event information) obtained or determined for the interaction to the current time (e.g., with regard to the first time period of the interaction), and/or status or progress information that can indicate what the status or progress made with regard to the interaction and/or what other information (e.g., other event information) is still desired (e.g., wanted) or what other tasks are yet to be performed in connection with the interaction.

At 908, during a second time period, wherein the second user and/or the second communication device associated with the second user is to enter the interaction, the interaction update information can be communicated to the second user, via the first VA or the second communication device, to facilitate updating the second user regarding the interaction. The CMC can communicate, or can initiate or facilitate communicating, the interaction update information to the first VA and/or the second communication device to facilitate updating the second user regarding the interaction, wherein the first VA or second communication device can present the interaction update information to the second user. The first VA or second communication device can present the interaction update information to the second user via presentation of the interaction update information, in visual form (e.g., textual information and/or visual images or video), on a display screen of the first VA or second communication device, and/or in audio form (e.g., verbal words or other sounds), via one or more speakers of the first VA or second communication device.

Figure 10:
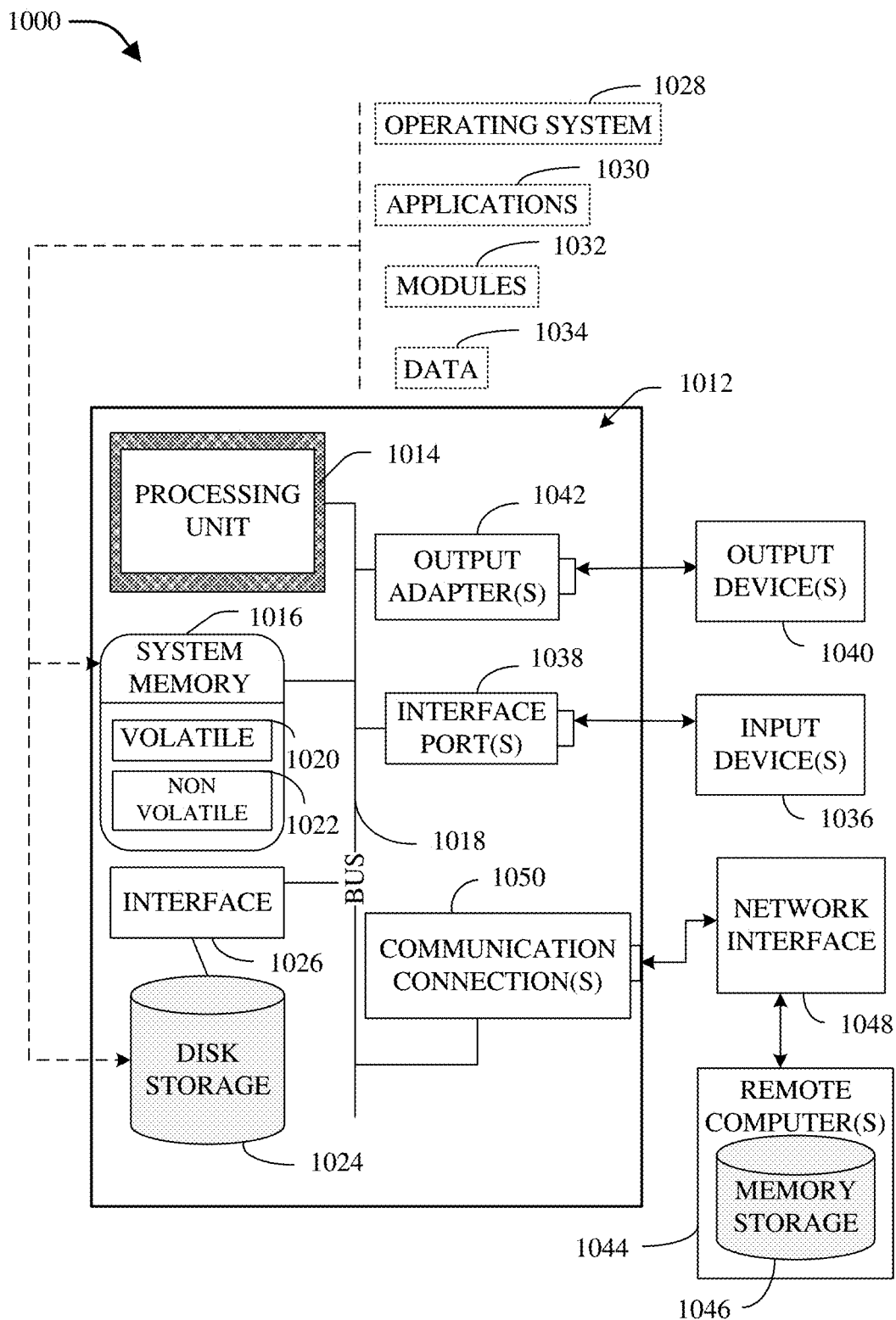
FIG. 10 is a schematic block diagram illustrating a suitable operating environment.
Figure 11:
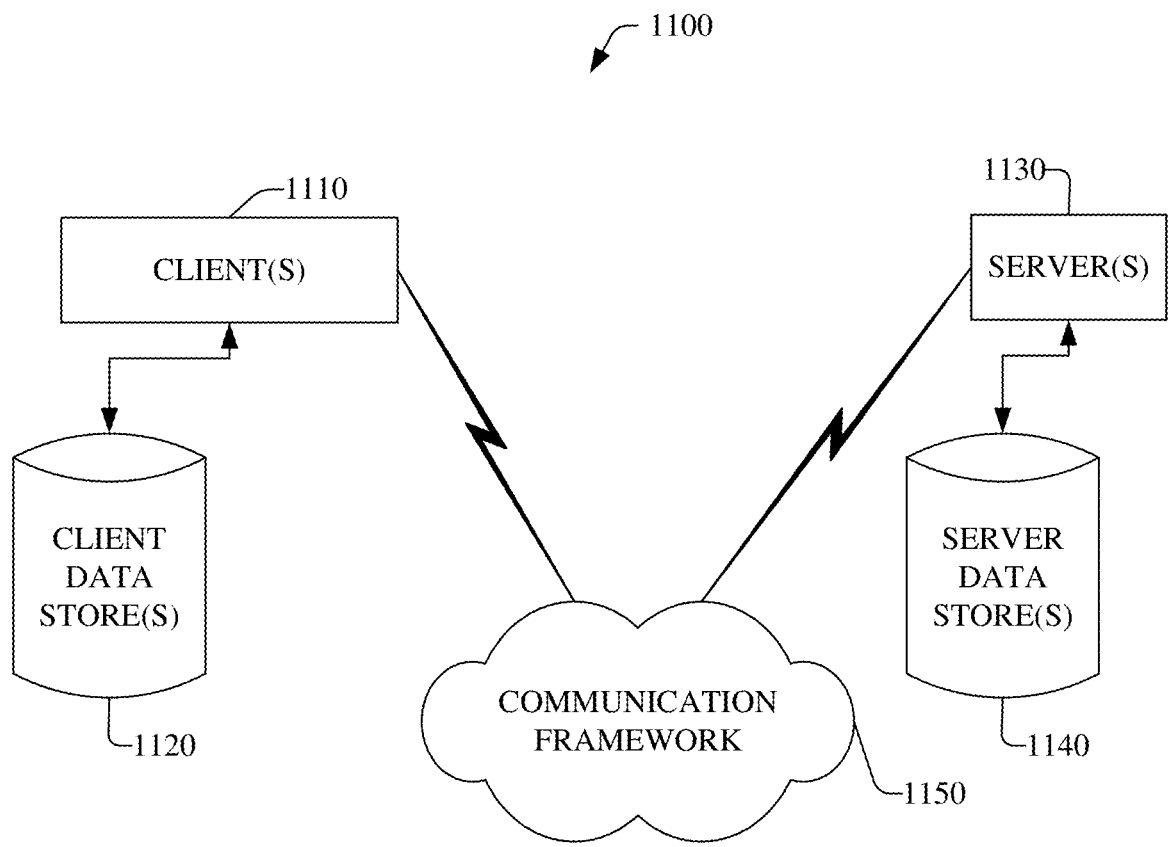
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 10, a suitable environment 1000 for implementing various aspects of this disclosure includes a computer 1012. The computer 1012 includes a processing unit 1014, a system memory 1016, and a system bus 1018. It is to be appreciated that the computer 1012 can be used in connection with implementing one or more of the systems, components, or methods shown and described in connection with FIGS. 1-9, or otherwise described herein. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored, e.g., in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 (e.g., computing system) with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well as non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, virtual assistant, communication management component, communication network, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
analyzing, by a system comprising a processor, information relating an interaction between a first virtual assistant device and a first device associated with a first user identity to determine a first context of the interaction;
managing, by the system, the first virtual assistant device based on the first context of the interaction, wherein the managing comprises managing a speed of an emulated voice of the first virtual assistant device with respect to, a presentation of audible words relating to an event by the first virtual assistant device to the first device associated with the first user identity based on the first context;
in response to determining that items of event information relating to the event are to be communicated from the first virtual assistant device to a second virtual assistant device based on a second context of the interaction determined from the analyzing, determining, by the system, an information list that indicates the items of event information that are to be communicated by the first virtual assistant device to the second virtual assistant device, wherein the items of event information comprise a first item of event information, a second item of event information, and a third item of event information that are arranged in an order in accordance with the information list; and
determining, by the system, that the second item of event information previously has been provided to the second virtual assistant device, wherein, based on the information list and the order that specifies that the first item of event information of the information list is to be provided first in the order, the second item of event information of the information list is to be provided second in the order after the first item of event information and before the third item of event information, and the third item of event information of the information list is to be provided third in the order after the second item of event information, and based on the determining that the second item of event information previously has been provided to the second virtual assistant device, and without a prompting, by the second virtual assistant device, for the first virtual assistant device to provide the items of event information associated with the information list to the second virtual assistant device, the first virtual assistant device communicates the first item of event information to the second virtual assistant device, and, after communicating the first item of event information to the second virtual assistant device, bypasses communication of the second item of event information in the order to the second virtual assistant device, and communicates the third item of event information to the second virtual assistant device.

2. The method of claim 1, comprising:
determining, by the system, that the second virtual assistant device is to communicate a portion of the event information relating to the event associated with the first user identity, wherein the second virtual assistant device is remote from the first virtual assistant device and is associated with the first user identity; and
in response to determining that the second virtual assistant device is to communicate the portion of the event information, determining, by the system, that the portion of the event information is to be communicated, in a non-verbal form, between the second virtual assistant device and the first virtual assistant device.

3. The method of claim 2, wherein the determining that the second virtual assistant device is to communicate the portion of the event information comprises determining that the second virtual assistant device is to communicate the portion of the event information based on at least one attribute associated with the second virtual assistant device, and wherein the at least one attribute is from a group of attributes comprising a performance attribute associated with the second virtual assistant device, a network attribute associated with the second virtual assistant device, an identifier attribute presented by the second virtual assistant device, and an attribute associated with the second context.

4. The method of claim 2, further comprising:
managing, by the system, a communication speed of the communicating of the portion of the event information between the second virtual assistant device and the first virtual assistant device to communicate the portion of the event information between the second virtual assistant device and the first virtual assistant device at a faster speed than the speed of the presentation of the audible words by the first virtual assistant device to the first device.

5. The method of claim 1, further comprising:
based on a result of an artificial intelligence analysis performed on the information relating the interaction:
determining, by the system, the first context of the interaction;
managing, by the system, the first virtual assistant device based on the first context of the interaction;
determining, by the system, the second context of the interaction; and
determining, by the system, a first subgroup of items of event information of the items of event information that are to be provided to the second virtual assistant device, and a second subgroup of items of event information of the items of event information that are to be bypassed and not provided to the second virtual assistant device.

6. The method of claim 1, wherein the interaction involves the first virtual assistant device, the second virtual assistant device, the first device, and a user associated with the first user identity as participants in connection with an event, and wherein the method further comprises:
in response to determining that the user is a passive participant in a first portion of the interaction based on the second context of the interaction, tracking, by the system, interaction-related information and activity relating to the interaction during a first time period that the user is determined to be the passive participant in the first portion of the interaction while the first virtual assistant device and the second virtual assistant device are actively participating in the interaction, comprising exchanging data with each other and performing tasks relating to the event; and
during a second time period, in response to determining the user is an active participant in a second portion of the interaction based on a third context of the interaction, communicating, by the system, interaction update information relating to the first portion of the interaction associated with the first time period to the first device associated with the user to update the user regarding the data that was exchanged and the tasks that were performed during the first portion of the interaction.

7. The method of claim 1, wherein the information relating the interaction is first information relating to the interaction, and wherein the method further comprises:
determining, by the system, the second context of the interaction based on the first information and second information relating to the interaction;
based on the second context:
determining, by the system, that the first virtual assistant device is to suspend the presentation of the audible words to the device; and
determining, by the system, that a portion of the event information relating to the event is to be communicated between the first device associated with the first user identity and the second device associated with the second user identity.

8. The method of claim 1, wherein the first virtual assistant device communicates the items of event information in non-verbal form, via a virtual assistant-to-virtual assistant communication channel, to the second virtual assistant device at a first communication rate that is faster than a second communication rate of the presentation of the audible words relating to the event by the first virtual assistant device.

9. The method of claim 1, wherein the second virtual assistant device is remote from the first virtual assistant device and is associated with the first device that is associated with the first user identity, and wherein the method further comprises:
based on the second context:
determining, by the system, that a portion of the event information relating to the event is to be communicated, in a non-verbal form, between the second virtual assistant device and the first virtual assistant device simultaneously with the presentation of the audible words by the first virtual assistant device to the first device.

10. The method of claim 1, wherein the second context occurs at a second time subsequent to a first time associated with the first context, wherein the second context relates to at least one circumstance of a group of circumstances comprising a consent is to be obtained from the first device associated with the first user identity, a length of time that has transpired since receiving a response to an inquiry from the first device, a number of times that the inquiry has been communicated to the first device without the response being received by the first virtual assistant device from the first device, a first portion of the event information relating to the event associated with the first user identity is to be obtained in audible word form from the first device, and a second portion of the event information is able to be communicated in a non-verbal form between virtual assistant devices, comprising the first virtual assistant device and the second virtual assistant device, and
wherein the managing of the first virtual assistant device comprises, at the second time, managing the first virtual assistant device based on the second context.

11. The method of claim 1, further comprising:
based on the first context, modifying, by the system, at least one parameter relating to the presentation of the audible words by the first virtual assistant device to the first device to modify at least one characteristic of the presentation of the audible words.

12. The method of claim 11, wherein the at least one characteristic is selected from a group of characteristics comprising the speed of the presentation of the audible words by the first virtual assistant device to the first device, a tone of the emulated voice of the first virtual assistant device in connection with the presentation of the audible words, an inflection of the emulated voice of the first virtual assistant device in connection with the presentation of the audible words, and a cadence of the emulated voice of the first virtual assistant device in connection with the presentation of the audible words.

13. A system, comprising:
a processor; and
a memory that stores executable instructions that, when executed by the processor, facilitate performance of operations, comprising:
analyzing information relating an interaction between a first virtual assistant device and a first device associated with a first user identity to determine a first context of the interaction;
controlling operation of the first virtual assistant device based on the first context of the interaction, wherein the controlling comprises controlling, based on the first context, a rate of a virtual voice of the first virtual assistant device with respect to, a presentation of verbal words relating to an event by the first virtual assistant device to the first device;

in response to determining that items of event data relating to the event are to be communicated from the first virtual assistant device to a second virtual assistant device based on a second context of the interaction determined from the analyzing, determining a data list that indicates the items of event data that are to be communicated by the first virtual assistant device to the second virtual assistant device, wherein the items of event data comprise a first item of event data, a second item of event data, and a third item of event data that are arranged in an order in accordance with the data list; and determining that the second item of event data previously has been made available to the second virtual assistant device, wherein, based on the data list and the order that indicates that the first item of event data of the data list is to be provided first in the order, the second item of event data of the data list is to be provided second in the order after the first item of event data and before the third item of event data, and the third item of event data of the data list is to be provided third in the order after the second item of event data, and based on the determining that the second item of event data previously has been made available to the second virtual assistant device, and without a request, by the second virtual assistant device, for the first virtual assistant device to provide the items of event data associated with the data list to the second virtual assistant device, the first virtual assistant device communicates the first item of event data to the second virtual assistant device, bypasses communication of the second item of event data in the order to the second virtual assistant device, and communicates the third item of event data to the second virtual assistant device.

14. The system of claim 13, wherein the operations comprise:

determining that the second virtual assistant device is to communicate a portion of the event data relating to the event, wherein the second virtual assistant device is remote from the first virtual assistant device and is associated with the first user identity; and in response to determining that the second virtual assistant device is to communicate the portion of the event data, determining that the portion of the event data is to be communicated, in a non-verbal form, between the second virtual assistant device and the first virtual assistant device.

15. The system of claim 14, wherein the rate is a first rate, and wherein the operations comprise:

controlling a second rate of the communication of the portion of the event data between the second virtual assistant device and the first virtual assistant device to communicate the portion of the event data between the second virtual assistant device and the first virtual assistant device at a higher rate than the first rate of the presentation of the verbal words by the first virtual assistant device to the first device.

16. The system of claim 13, wherein the operations comprise:

in response to determining that a data communication channel used for non-verbal data communication is not available to the first virtual assistant device and the second virtual assistant device, controlling the first virtual assistant device and the second virtual assistant device to have the first virtual assistant device communicate the items of event data to the second virtual assistant device in verbal word form via an audio communication channel; and controlling a first characteristic of the first virtual assistant device and a second characteristic of the second virtual assistant device to increase a speed of the communication of the items of event data in the verbal word form by the first virtual assistant device to the second virtual assistant device to a first speed that is a higher speed of data communication than a second speed of communication of the items of event data that otherwise would be able to be achieved by communication of the items of event data in the verbal form by the first virtual assistant device to the first device associated with a user associated with the first user identity based on a determination regarding an inability of the user to understand the items of event data in verbal word form at the first speed.

17. The system of claim 13, wherein the information relating the interaction is first information relating to the interaction, and wherein the operations comprise:

determining the second context of the interaction based on the first information and second information relating to the interaction;

based on the second context:

determining that the first virtual assistant device is to discontinue the presentation of the verbal words to the first device; and determining that a portion of the event data relating to the event is to be communicated, in verbal word form, between the first device associated with the first user identity and the second device associated with the second user identity.

18. The system of claim 13, wherein the operations comprise:

based on the first context, adjusting at least one parameter relating to the presentation of the verbal words by the first virtual assistant device to the first device to adjust at least one attribute of the presentation of the verbal words, wherein the at least one attribute is selected from a group of attributes comprising the rate of the presentation of the verbal words by the first virtual assistant device to the first device, a tone of the virtual voice of the first virtual assistant device in connection with the presentation of the verbal words, an inflection of the virtual voice of the first virtual assistant device in connection with the presentation of the verbal words, and a cadence of the virtual voice of the first virtual assistant device in connection with the presentation of the verbal words.

19. A non-transitory machine-readable medium, comprising executable instructions that, when executed by a processor, facilitate performance of operations, comprising:

analyzing data relating an interaction between a first virtual assistant device and a first device associated with a first user identity to determine a first context of the interaction, wherein the interaction relates to an event;

managing operation of the first virtual assistant device based on the first context of the interaction, wherein the managing comprises managing, based on the first context, a speed of a virtual voice of the first virtual assistant device with respect to, a presentation of verbal words by the first virtual assistant device to the first device;

in response to determining that items of event data relating to the event are to be communicated from the first virtual assistant device to a second virtual assistant device based on a second context of the interaction determined from the analyzing, determining a data list that indicates the items of event data that are to be communicated by the first virtual assistant device to the second virtual assistant device, wherein the items of event data comprise a first item of event data, a second item of event data, and a third item of event data that are arranged in an order in accordance with the data list; and determining that the second item of event data previously has been provided to the second virtual assistant device, wherein, based on the data list and the order that indicates that the first item of event data of the data list is to be provided first in the order, the second item of event data of the data list is to be provided second in the order after the first item of event data and before the third item of event data, and the third item of event data of the data list is to be provided third in the order after the second item of event data, and based on the determining that the second item of event data previously has been provided to the second virtual assistant device, and without a prompting, by the second virtual assistant device, for the first virtual assistant device to provide the items of event data associated with the data list to the second virtual assistant device, the first virtual assistant device communicates the first item of event data to the second virtual assistant device, omits communication of the second item of event data in the order to the second virtual assistant device, and communicates the third item of event data to the second virtual assistant device.

20. The non-transitory machine-readable medium of claim 19, wherein the operations further comprise:

based on the first context, modifying at least one parameter relating to the presentation of the verbal words by the first virtual assistant device to the first device to modify at least one characteristic of the presentation of the verbal words, wherein the at least one characteristic is selected from a group of characteristics comprising the speed of the presentation of the verbal words by the first virtual assistant device to the first device, a tone of the virtual voice of the first virtual assistant device in connection with the presentation of the verbal words, an inflection of the virtual voice of the first virtual assistant device in connection with the presentation of the verbal words, and a cadence of the virtual voice of the first virtual assistant device in connection with the presentation of the verbal words.

\* \* \* \* \*